(12) United States Patent
Ishitani et al.

(10) Patent No.: US 10,095,071 B2
(45) Date of Patent: Oct. 9, 2018

(54) LIQUID CRYSTAL DISPLAY DEVICE INCLUDING TRANSISTOR WHICH INCLUDES OXIDE SEMICONDUCTOR

(71) Applicant: Semiconductor Energy Laboratory Co., Ltd., Atsugi-shi, Kanagawa-ken (JP)

(72) Inventors: Tetsuji Ishitani, Isehara (JP); Daisuke Kubota, Isehara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 167 days.

(21) Appl. No.: 15/155,094

(22) Filed: May 16, 2016

(65) Prior Publication Data

US 2016/0259217 A1 Sep. 8, 2016

Related U.S. Application Data

(63) Continuation of application No. 13/785,233, filed on Mar. 5, 2013, now Pat. No. 9,348,189, which is a
(Continued)

(30) Foreign Application Priority Data

Dec. 3, 2008 (JP) ................... 2008-308787

(51) Int. Cl.
*G02F 1/1343* (2006.01)
*G02F 1/1335* (2006.01)
(Continued)

(52) U.S. Cl.
CPC ...... *G02F 1/134309* (2013.01); *G02F 1/1368* (2013.01); *G02F 1/13439* (2013.01);
(Continued)

(58) Field of Classification Search
CPC ............ G02F 1/134363; G02F 1/1362; G02F 2001/134372; G02F 1/133514;
(Continued)

(56) References Cited

U.S. PATENT DOCUMENTS 5,530,265 A 6/1996 Takemura
5,696,011 A 12/1997 Yamazaki et al.
(Continued)

FOREIGN PATENT DOCUMENTS

CN 001703772 A 11/2005
CN 001941299 A 4/2007
(Continued)

OTHER PUBLICATIONS

Chinese Office Action (Application No. 201510679637.2) dated Oct. 24, 2017.
(Continued)

*Primary Examiner* — Huyen Ngo
(74) *Attorney, Agent, or Firm* — Robinson Intellectual Property Law Office; Eric J. Robinson

(57) ABSTRACT

A liquid crystal display device is provided, which includes a transistor including an oxide semiconductor layer, a resin layer, a first electrode layer, a second electrode layer having an opening, and a liquid crystal layer. One of the first electrode layer and the second electrode layer is a pixel electrode layer which is electrically connected to the transistor, and the other of the first electrode layer and the second electrode layer is a common electrode layer. The liquid crystal display device is configured to display an image by a lateral electric field mode.

7 Claims, 17 Drawing Sheets

Related U.S. Application Data continuation of application No. 12/627,187, filed on Nov. 30, 2009, now Pat. No. 8,395,716.

(51) Int. Cl.
  *G02F 1/1362* (2006.01)
  *G02F 1/1368* (2006.01)

(52) U.S. Cl.
  CPC .. *G02F 1/133514* (2013.01); *G02F 1/136227* (2013.01); *G02F 2001/134372* (2013.01); *G02F 2001/136222* (2013.01)

(58) Field of Classification Search
  CPC ............... G02F 1/1343; H01L 27/1288; H01L 29/78696; H01L 27/124; H01L 29/4908; H01L 2029/42388; H01L 29/42384; H01L 29/7869; H01L 29/78693; H01L 29/0657
  See application file for complete search history.

(56) References Cited

U.S. PATENT DOCUMENTS

| | | |
|---|---|---|
| 5,701,167 A | 12/1997 | Yamazaki |
| 5,744,864 A | 4/1998 | Cillessen et al. |
| 5,847,410 A | 12/1998 | Nakajima |
| 6,122,027 A | 9/2000 | Ogawa et al. |
| 6,191,835 B1 | 2/2001 | Choi |
| 6,294,274 B1 | 9/2001 | Kawazoe et al. |
| 6,532,045 B2 | 3/2003 | Chung et al. |
| 6,563,174 B2 | 5/2003 | Kawasaki et al. |
| 6,586,346 B1 | 7/2003 | Yamazaki et al. |
| 6,590,627 B2 | 7/2003 | Tomioka et al. |
| 6,674,136 B1 | 1/2004 | Ohtani |
| 6,727,522 B1 | 4/2004 | Kawasaki et al. |
| 6,781,152 B2 | 8/2004 | Yamazaki |
| 6,816,222 B2 | 11/2004 | Ono et al. |
| 6,852,998 B2 | 2/2005 | Sung et al. |
| 6,879,359 B1 | 4/2005 | Kikkawa et al. |
| 6,900,461 B2 | 5/2005 | Inoue et al. |
| 6,958,799 B2 | 10/2005 | Tomioka et al. |
| 6,960,812 B2 | 11/2005 | Yamazaki et al. |
| 7,009,204 B2 | 3/2006 | Tsai et al. |
| 7,046,321 B2 | 5/2006 | Kikkawa et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,067,843 B2 | 6/2006 | Carcia et al. |
| 7,075,614 B2 | 7/2006 | Izumi et al. |
| 7,105,868 B2 | 9/2006 | Nause et al. |
| 7,119,364 B2 | 10/2006 | Yamazaki |
| 7,136,130 B2 | 11/2006 | Ono et al. |
| 7,211,825 B2 | 5/2007 | Shih et al. |
| 7,282,782 B2 | 10/2007 | Hoffman et al. |
| 7,295,268 B2 | 11/2007 | Ono et al. |
| 7,297,977 B2 | 11/2007 | Hoffman et al. |
| 7,301,211 B2 | 11/2007 | Yamazaki et al. |
| 7,323,356 B2 | 1/2008 | Hosono et al. |
| 7,402,506 B2 | 7/2008 | Levy et al. |
| 7,411,209 B2 | 8/2008 | Endo et al. |
| 7,440,073 B2 | 10/2008 | Sawasaki |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,470,607 B2 | 12/2008 | Carcia et al. |
| 7,501,293 B2 | 3/2009 | Ito et al. |
| 7,576,394 B2 | 8/2009 | Furuta et al. |
| 7,576,829 B2 | 8/2009 | Kikuchi et al. |
| 7,674,650 B2 | 3/2010 | Akimoto et al. |
| 7,687,808 B2 | 3/2010 | Umezaki |
| 7,732,819 B2 | 6/2010 | Akimoto et al. |
| 7,772,021 B2 | 8/2010 | Lee et al. |
| 7,773,182 B2 | 8/2010 | Kimura et al. |
| 7,816,682 B2 | 10/2010 | Kimura |
| 7,821,065 B2 | 10/2010 | Murakami et al. |
| 7,830,477 B2 | 11/2010 | Kim |
| 7,872,722 B2 | 1/2011 | Kimura |
| 7,880,836 B2 | 2/2011 | Kimura et al. |
| 7,880,848 B2 | 2/2011 | Kimura et al. |
| 7,889,295 B2 | 2/2011 | Kimura et al. |
| 7,907,224 B2 | 3/2011 | Ito et al. |
| 7,910,490 B2 | 3/2011 | Akimoto et al. |
| 7,923,287 B2 | 4/2011 | Lee et al. |
| 7,932,521 B2 | 4/2011 | Akimoto et al. |
| 7,952,651 B2 | 5/2011 | Kimura |
| 7,960,730 B2 | 6/2011 | Lee et al. |
| 7,964,876 B2 | 6/2011 | Umezaki |
| 7,978,274 B2 | 7/2011 | Umezaki et al. |
| 7,978,301 B2 | 7/2011 | Takeda et al. |
| 7,981,734 B2 | 7/2011 | Furuta et al. |
| 7,999,892 B2 | 8/2011 | Kimura et al. |
| 8,039,288 B2 | 10/2011 | Yamazaki |
| 8,054,279 B2 | 11/2011 | Umezaki et al. |
| 8,098,006 B2 * | 1/2012 | Ishizaki ............... H01L 27/322 313/504 |
| 8,130,354 B2 | 3/2012 | Kimura |
| 8,164,729 B2 | 4/2012 | Kimura et al. |
| 8,199,267 B2 | 6/2012 | Kimura |
| 8,274,077 B2 | 9/2012 | Akimoto et al. |
| 8,338,865 B2 | 12/2012 | Kimura |
| 8,395,716 B2 | 3/2013 | Ishitani et al. |
| 8,445,962 B2 | 5/2013 | Murakami et al. |
| 8,466,463 B2 | 6/2013 | Akimoto et al. |
| 8,466,482 B2 | 6/2013 | Yamazaki |
| 8,508,700 B2 | 8/2013 | Kimura et al. |
| 8,542,330 B2 | 9/2013 | Kimura |
| 8,619,227 B2 | 12/2013 | Kimura et al. |
| 8,629,069 B2 | 1/2014 | Akimoto et al. |
| 8,669,550 B2 | 3/2014 | Akimoto et al. |
| 8,675,158 B2 | 3/2014 | Kimura et al. |
| 8,780,307 B2 | 7/2014 | Kimura |
| 8,785,258 B2 | 7/2014 | Yamazaki |
| 8,790,959 B2 | 7/2014 | Akimoto et al. |
| 8,796,069 B2 | 8/2014 | Akimoto et al. |
| 8,841,671 B2 | 9/2014 | Kimura |
| 8,847,316 B2 | 9/2014 | Murakami et al. |
| 8,872,182 B2 | 10/2014 | Kimura |
| 8,890,157 B2 | 11/2014 | Liu et al. |
| 8,952,381 B2 | 2/2015 | Yamazaki |
| 8,964,156 B2 | 2/2015 | Kimura |
| 9,099,562 B2 | 8/2015 | Akimoto et al. |
| 9,105,521 B2 | 8/2015 | Yamazaki |
| 9,153,604 B2 | 10/2015 | Murakami et al. |
| 9,268,188 B2 | 2/2016 | Kimura |
| 9,291,863 B2 | 3/2016 | Onogi et al. |
| 9,348,189 B2 | 5/2016 | Ishitani et al. |
| 9,709,861 B2 | 7/2017 | Kimura |
| 9,946,125 B2 | 4/2018 | Onogi et al. |
| 10,001,678 B2 | 6/2018 | Kimura |
| 2001/0046027 A1 | 11/2001 | Tai et al. |
| 2002/0056838 A1 | 5/2002 | Ogawa |
| 2002/0109796 A1 | 8/2002 | Lin et al. |
| 2002/0132454 A1 | 9/2002 | Ohtsu et al. |
| 2003/0189401 A1 | 10/2003 | Kido et al. |
| 2004/0038446 A1 | 2/2004 | Takeda et al. |
| 2004/0127038 A1 | 7/2004 | Carcia et al. |
| 2004/0132293 A1 | 7/2004 | Takayama et al. |
| 2004/0263752 A1 | 12/2004 | Kim |
| 2005/0199959 A1 | 9/2005 | Chiang et al. |
| 2005/0259206 A1 | 11/2005 | Son |
| 2005/0275038 A1 | 12/2005 | Shih et al. |
| 2006/0035452 A1 | 2/2006 | Carcia et al. |
| 2006/0086933 A1 | 4/2006 | Iechi et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0163743 A1 | 7/2006 | Kuwabara et al. |

(56) References Cited

U.S. PATENT DOCUMENTS

| | | |
|---|---|---|
| 2006/0169973 A1 | 8/2006 | Isa et al. |
| 2006/0170067 A1 | 8/2006 | Maekawa et al. |
| 2006/0170111 A1 | 8/2006 | Isa et al. |
| 2006/0183274 A1 | 8/2006 | Carcia et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0243979 A1 | 11/2006 | Park et al. |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0286737 A1 | 12/2006 | Levy et al. |
| 2006/0292777 A1 | 12/2006 | Dunbar |
| 2007/0002261 A1* | 1/2007 | Lee ................ G02F 1/13392 349/155 |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0072439 A1 | 3/2007 | Akimoto et al. |
| 2007/0090365 A1 | 4/2007 | Hayashi et al. |
| 2007/0108446 A1 | 5/2007 | Akimoto |
| 2007/0146591 A1* | 6/2007 | Kimura ............ G02F 1/133345 349/114 |
| 2007/0158652 A1 | 7/2007 | Lee et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0284627 A1 | 12/2007 | Kimura |
| 2007/0287296 A1 | 12/2007 | Chang |
| 2008/0006877 A1 | 1/2008 | Mardilovich et al. |
| 2008/0024416 A1 | 1/2008 | Onogi et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0068359 A1 | 3/2008 | Yoshida et al. |
| 2008/0073653 A1 | 3/2008 | Iwasaki |
| 2008/0083927 A1 | 4/2008 | Nishiura et al. |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0198108 A1 | 8/2008 | Aoki |
| 2008/0203387 A1 | 8/2008 | Kang et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0266479 A1 | 10/2008 | Lim |
| 2008/0296568 A1 | 12/2008 | Ryu et al. |
| 2008/0308796 A1 | 12/2008 | Akimoto et al. |
| 2008/0308797 A1 | 12/2008 | Akimoto et al. |
| 2008/0308804 A1 | 12/2008 | Akimoto et al. |
| 2008/0308805 A1 | 12/2008 | Akimoto et al. |
| 2008/0308806 A1 | 12/2008 | Akimoto et al. |
| 2009/0008639 A1 | 1/2009 | Akimoto et al. |
| 2009/0065771 A1 | 3/2009 | Iwasaki et al. |
| 2009/0073325 A1 | 3/2009 | Kuwabara et al. |
| 2009/0114910 A1 | 5/2009 | Chang |
| 2009/0114911 A1 | 5/2009 | Maekawa et al. |
| 2009/0134399 A1 | 5/2009 | Sakakura et al. |
| 2009/0152541 A1 | 6/2009 | Maekawa et al. |
| 2009/0153762 A1 | 6/2009 | Kuwabara et al. |
| 2009/0186437 A1 | 7/2009 | Akimoto |
| 2009/0186445 A1 | 7/2009 | Akimoto |
| 2009/0189155 A1 | 7/2009 | Akimoto |
| 2009/0189156 A1 | 7/2009 | Akimoto |
| 2009/0239335 A1 | 9/2009 | Akimoto et al. |
| 2010/0019656 A1* | 1/2010 | Yu .................... H01L 27/322 313/504 |
| 2011/0104851 A1 | 5/2011 | Akimoto et al. |
| 2011/0121290 A1 | 5/2011 | Akimoto et al. |
| 2011/0227066 A1 | 9/2011 | Umezaki |
| 2011/0260169 A1 | 10/2011 | Umezaki et al. |
| 2011/0285929 A1 | 11/2011 | Kubota et al. |
| 2012/0049184 A1 | 3/2012 | Umezaki et al. |
| 2012/0056860 A1 | 3/2012 | Umezaki et al. |
| 2012/0162561 A1 | 6/2012 | Kimura |
| 2013/0329176 A1 | 12/2013 | Kuniyoshi |
| 2014/0016053 A1 | 1/2014 | Kimura |
| 2014/0184976 A1 | 7/2014 | Kimura et al. |
| 2014/0327000 A1 | 11/2014 | Tochibayashi et al. |
| 2015/0049279 A1 | 2/2015 | Yamazaki |
| 2015/0318405 A1 | 11/2015 | Hayashi et al. |
| 2015/0340513 A1 | 11/2015 | Akimoto et al. |
| 2016/0231628 A1 | 8/2016 | Onogi et al. |
| 2017/0146873 A1 | 5/2017 | Onogi et al. |
| 2017/0307943 A1 | 10/2017 | Kimura |

FOREIGN PATENT DOCUMENTS

| | | |
|---|---|---|
| CN | 101075051 A | 11/2007 |
| CN | 101159273 A | 4/2008 |
| CN | 101226901 A | 7/2008 |
| EP | 0903613 A | 3/1999 |
| EP | 1033755 A | 9/2000 |
| EP | 1134811 A | 9/2001 |
| EP | 1396881 A | 3/2004 |
| EP | 1743931 A | 1/2007 |
| EP | 1770788 A | 4/2007 |
| EP | 1793266 A | 6/2007 |
| EP | 1876489 A | 1/2008 |
| EP | 1933385 A | 6/2008 |
| EP | 1995787 A | 11/2008 |
| EP | 1998373 A | 12/2008 |
| EP | 1998374 A | 12/2008 |
| EP | 1998375 A | 12/2008 |
| EP | 2270583 A | 1/2011 |
| EP | 2479604 A | 7/2012 |
| EP | 2479605 A | 7/2012 |
| EP | 3196925 A | 7/2017 |
| JP | 60-170972 A | 9/1985 |
| JP | 02-226729 A | 9/1990 |
| JP | 03-231472 A | 10/1991 |
| JP | 05-251705 A | 9/1993 |
| JP | 06-088972 A | 3/1994 |
| JP | 08-264794 A | 10/1996 |
| JP | 10-253976 A | 9/1998 |
| JP | 11-024107 A | 1/1999 |
| JP | 11-119238 A | 4/1999 |
| JP | 11-505377 | 5/1999 |
| JP | 2000-044236 A | 2/2000 |
| JP | 2000-147493 A | 5/2000 |
| JP | 2000-150900 A | 5/2000 |
| JP | 2002-076356 A | 3/2002 |
| JP | 2002-258262 A | 9/2002 |
| JP | 2002-289859 A | 10/2002 |
| JP | 2002-296615 A | 10/2002 |
| JP | 2002-311227 A | 10/2002 |
| JP | 2002-328385 A | 11/2002 |
| JP | 2003-075830 A | 3/2003 |
| JP | 2003-086000 A | 3/2003 |
| JP | 2003-086808 A | 3/2003 |
| JP | 2003-156743 A | 5/2003 |
| JP | 2004-103957 A | 4/2004 |
| JP | 2004-273732 A | 9/2004 |
| JP | 2006-003520 A | 1/2006 |
| JP | 2006-053419 A | 2/2006 |
| JP | 2006-190923 A | 7/2006 |
| JP | 2007-096055 A | 4/2007 |
| JP | 2007-115902 A | 5/2007 |
| JP | 2007-123861 A | 5/2007 |
| JP | 2007-183583 A | 7/2007 |
| JP | 2007-183585 A | 7/2007 |
| JP | 2007-250983 A | 9/2007 |

(56) References Cited

FOREIGN PATENT DOCUMENTS

| | | |
|---|---|---|
| JP | 2007-334317 A | 12/2007 |
| JP | 2008-032899 A | 2/2008 |
| JP | 2008-033311 A | 2/2008 |
| JP | 2008-116502 A | 5/2008 |
| JP | 2008-130689 A | 6/2008 |
| JP | 2008-535205 | 8/2008 |
| JP | 2008-233484 A | 10/2008 |
| JP | 2008-286911 A | 11/2008 |
| JP | 2008-287026 A | 11/2008 |
| JP | 2010-156960 A | 7/2010 |
| KR | 2000-0035523 A | 6/2000 |
| KR | 2001-0055903 A | 7/2001 |
| KR | 2008-0048936 A | 6/2008 |
| KR | 2008-0054228 A | 6/2008 |
| TW | 200600880 | 1/2006 |
| TW | 200742888 | 11/2007 |
| TW | 200834197 | 8/2008 |
| WO | WO-2004/034449 | 4/2004 |
| WO | WO-2004/114391 | 12/2004 |
| WO | WO-2007/066677 | 6/2007 |
| WO | WO-2007/089048 | 8/2007 |
| WO | WO-2007/119386 | 10/2007 |

OTHER PUBLICATIONS

Fortunato.E et al., "Wide-Bandgap High-Mobility ZnO Thin-Film Transistors Produced at Room Temperature", Appl. Phys. Lett. (Applied Physics Letters), Sep. 27, 2004, vol. 85, No. 13, pp. 2541-2543.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Nomura.K et al., "Thin-Film Transistor Fabricated in Single-Crystalline Transparent Oxide Semiconductor", Science, May 23, 2003, vol. 300, No. 5623, pp. 1269-1272.

Masuda.S et al., "Transparent thin film transistors using ZnO as an active channel layer and their electrical properties", J. Appl. Phys. (Journal of Applied Physics), Feb. 1, 2003, vol. 93, No. 3, pp. 1624-1630.

Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.

Nomura.K et al., "Carrier transport in transparent oxide semiconductor with intrinsic structural randomness probed using single-crystalline $InGaO_3(ZnO)_5$ films", Appl. Phys. Lett. (Applied Physics Letters), Sep. 13, 2004, vol. 85, No. 11, pp. 1993-1995.

Kamiya.T et al., "1a-F-5 Room temperature fabrication and carrier transport of amorphous semiconductor exhibiting large electron Hall mobilities > 10 cm2/Vs", (The 65th Autumn Meeting, 2004) The Japan Society of Applied Physics, Sep. 1, 2004, No. 2, p. 791.

Nomura.K et al., "31a-ZA-6 Carrier Transport in Transparent Amorphous Oxide Semiconductor $InGaZnO_4$", (The 51st Spring Meeting,2004); The Japan Society of Applied Physics and Related Societies, Mar. 28, 2004, No. 2, p. 669.

Li.C et al., "Modulated Structures of Homologous Compounds $InMO_3(ZnO)_m$ (M=In,Ga; m=Integer) Described by Four-Dimensional Superspace Group", Journal of Solid State Chemistry, 1998, vol. 139, pp. 347-355.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Ikeda.T et al., "Full-Functional System Liquid Crystal Display Using CG-Silicon Technology", SID Digest '04 : SID International Symposium Digest of Technical Papers, 2004, vol. 35, pp. 860-863.

Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.

Prins.M et al., "A Ferroelectric Transparent Thin-Film Transistor", Appl. Phys. Lett. (Applied Physics Letters) , Jun. 17, 1996, vol. 68, No. 25, pp. 3650-3652.

Nakamura.M et al., "The phase relations in the $In_2O_3$—$Ga_2ZnO_4$—ZnO system at 1350° C.", Journal of Solid State Chemistry, Aug. 1, 1991, vol. 93, No. 2, pp. 298-315.

Kimizuka.N et al., "Syntheses and Single-Crystal Data of Homologous Compounds, $In_2O_3(ZnO)_m$ (m=3, 4, and 5), $InGaO_3(ZnO)_3$, and $Ga_2O_3(ZnO)_m$ (m=7, 8, 9, and 16) in the $In_2O_3$—$ZnGa_2O_4$—ZnO System", Journal of Solid State Chemistry, Apr. 1, 1995, vol. 116, No. 1, pp. 170-178.

Osada.T et al., "15.2: Development of Driver-Integrated Panel using Amorphous In—Ga—Zn-Oxide TFT", SID Digest '09: SID International Symposium Digest of Technical Papers, May 31, 2009, pp. 184-187.

Lee.J et al., "World's Largest (15-Inch) XGA AMLCD Panel Using IGZO Oxide TFT", SID Digest '08: SID International Symposium Digest of Technical Papers, May 20, 2008, vol. 39, pp. 625-628.

Nowatari.H et al., "60.2: Intermediate Connector With Suppressed Voltage Loss for White Tandem OLEDS", SID Digest '09: SID International Symposium Digest of Technical Papers, May 31, 2009, vol. 40, pp. 899-902.

Kanno.H et al., "White Stacked Electrophosphorecent Organic Light-Emitting Devices Employing $MOO_3$ as a Charge-Generation Layer", Adv. Mater. (Advanced Materials), 2006, vol. 18, No. 3, pp. 339-342.

Tsuda.K et al., "Ultra Low Power Consumption Technologies for Mobile TFT-LCDs", IDW '02: Proceedings of the 9th International Display Workshops, Dec. 4, 2002, pp. 295-298.

Jeong.J et al., "3.1: Distinguished Paper: 12.1-Inch WXGA AMOLED Display Driven by Indium-Gallium-Zinc Oxide TFTs Array", SID Digest '08: SID International Symposium Digest of Technical Papers, May 20, 2008, vol. 39, No. 1, pp. 1-4.

Kurokawa.Y et al., "UHF RFCPUS on Flexible and Glass Substrates for Secure RFID Systems", Journal of Solid-State Circuits , 2008, vol. 43, No. 1, pp. 292-299.

Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

Cho.D et al., "21.2:Al and Sn-Doped Zinc Indium Oxide Thin Film Transistors for AMOLED Back-Plane", SID Digest '09: SID International Symposium Digest of Technical Papers, May 31, 2009, pp. 280-283.

Lee.M et al., "15.4:Excellent Performance of Indium-Oxide-Based Thin-Film Transistors by DC Sputtering", SID Digest '09: SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and its Bending Properties", SID Digest '09: SID International Symposium Digest of Technical Papers, May 31, 2009, pp 983-985.

Sakata.J et al., "Development of 4.0-In. AMOLED Display With Driver Circuit Using Amorphous In—Ga—Zn-Oxide TFTS", IDW '09: Proceedings of the 16th International Display Workshops, 2009, pp. 689-692.

Park.J et al., "Amorphous Indium-Gallium-Zinc Oxide TFTS and Their Application for Large Size AMOLED", AM-FPD '08 Digest of Technical Papers, Jul. 2, 2008, pp. 275-278.

Park.S et al., "Challenge to Future Displays: Transparent AM-OLED Driven by Peald Grown ZnO TFT", IMID '07 Digest, 2007, pp. 1249-1252.

Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.

Osada.T et al., "Development of Driver-Integrated Panel Using Amorphous In—Ga—Zn-Oxide TFT", AM-FPD '09 Digest of Technical Papers, Jul. 1, 2009, pp. 33-36.

(56) References Cited

OTHER PUBLICATIONS

Hirao.T et al., "Novel Top-Gate Zinc Oxide Thin-Film Transistors (ZnO TFTS) for AMLCDS", J. Soc. Inf. Display (Journal of the Society for Information Display), 2007, vol. 15, No. 1, pp. 17-22.

Hosono.H, "68.3:Invited Paper:Transparent Amorphous Oxide Semiconductors for High Performance TFT", SID Digest '07: SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn-Oxide TFT", SID Digest '09: SID International Symposium Digest of Technical Papers, May 31, 2009, pp. 1110-1112.

Ohara.H et al., "21.3:4.0 In. QVGA AMOLED Display Using In—Ga—Zn-Oxide TFTS With a Novel Passivation Layer", SID Digest '09: SID International Symposium Digest of Technical Papers, May 31, 2009, pp. 284-287.

Miyasaka.M, "SUFTLA Flexible Microelectronics on Their Way to Business", SID Digest '07: SID International Symposium Digest of Technical Papers, 2007, vol. 38, pp. 1673-1676.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications", SID Digest '09: SID International Symposium Digest of Technical Papers, May 31, 2009, pp. 578-581.

Asaoka.Y et al., "29.1: Polarizer-Free Reflective LCD Combined With Ultra Low-Power Driving Technology", SID Digest '09: SID International Symposium Digest of Technical Papers, May 31, 2009, pp. 395-398.

Lee.H et al., "Current Status of, Challenges to, and Perspective View of AM-OLED", IDW '06: Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application", SID Digest '07: SID International Symposium Digest of Technical Papers, 2007, vol. 38, pp. 1737-1740.

Kikuchi.H et al., "Polymer-Stabilized Liquid Crystal Blue Phases", Nature Materials, Sep. 2, 2002, vol. 1, pp. 64-68.

Kimizuka.N et al., "Spinel,YbFe2O4, and Yb2Fe3O7 Types of Structures for Compounds in the In2O3 and Sc2O3—A2O3—BO Systems [A; Fe, Ga, or Al; B: Mg, Mn, Fe, Ni, Cu,or Zn] at Temperatures Over 1000° C.", Journal of Solid State Chemistry, 1985, vol. 60, pp. 382-384.

Kitzerow.H et al., "Observation of Blue Phases in Chiral Networks", Liquid Crystals, 1993, vol. 14, No. 3, pp. 911-916.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Chinese Office Action (Application No. 200910251297.8) dated Jul. 19, 2013.

Korean Office Action (Application No. 2009-0116753) dated Aug. 6, 2014.

Korean Office Action (Application No. 2009-0116753) dated Nov. 20, 2014.

Taiwanese Office Action (Application No. 098140375) dated Jan. 27, 2015.

Taiwanese Office Action (Application No. 098140375) dated Jun. 18, 2015.

\* cited by examiner

LIQUID CRYSTAL DISPLAY DEVICE INCLUDING TRANSISTOR WHICH INCLUDES OXIDE SEMICONDUCTOR

BACKGROUND OF THE INVENTION

1. Field of the Invention

The present invention relates to a liquid crystal display device using an oxide semiconductor and a method for manufacturing the same.

2. Description of the Related Art

As typically seen in a liquid crystal display device, a thin film transistor formed over a flat plate such as a glass substrate is manufactured using amorphous silicon or polycrystalline silicon. A thin film transistor manufactured using amorphous silicon has low field effect mobility, but can be formed over a larger glass substrate. In contrast, a thin film transistor manufactured using polycrystalline silicon has high field effect mobility, but needs a crystallization step such as laser annealing and is not always suitable for a larger glass substrate.

In view of the foregoing, attention has been drawn to a technique for manufacturing a thin film transistor using an oxide semiconductor and applying the thin film transistor to an electronic device or an optical device. For example, Patent Document 1 and Patent Document 2 disclose a technique by which a thin film transistor is manufactured using zinc oxide or an In—Ga—Zn—O-based oxide semiconductor for an oxide semiconductor film and such a transistor is used as a switching element or the like of an image display device.

The thin film transistor in which a channel formation region is formed using an oxide semiconductor has higher field effect mobility than a thin film transistor using amorphous silicon. The oxide semiconductor film can be formed by a sputtering method or the like at a temperature 300° C. or lower. Its manufacturing process is easier than that of a thin film transistor using polycrystalline silicon.

The oxide semiconductor is a transparent semiconductor which transmits light in a visible wavelength range; thus, it is said that use of the oxide semiconductor for a pixel of a display device makes it possible to provide a high aperture ratio.

Such an oxide semiconductor is expected to be used for forming a thin film transistor on a glass substrate, a plastic substrate, or the like, and to be applied to a display device.

REFERENCE

[Patent Document 1] Japanese Published Patent Application No. 2007-123861

[Patent Document 2] Japanese Published Patent Application No. 2007-096055

SUMMARY OF THE INVENTION

Thus, it is an object to provide a liquid crystal display device which is suitable for a thin film transistor using an oxide semiconductor.

In a liquid crystal display device including thin film transistors each including an oxide semiconductor layer, a film having a function of attenuating the intensity of transmitting visible light is used for an interlayer film which covers at least the oxide semiconductor layer. The film having a function of attenuating the intensity of transmitting visible light is a film having a transmittance of visible light lower than the oxide semiconductor layer. As the film having a function of attenuating the intensity of transmitting visible light, a coloring layer can be used, and a light-transmitting chromatic-color resin layer is preferable. Alternatively, in the interlayer film including a light-transmitting chromatic-color resin layer and a light-blocking layer, the light-blocking layer may be used as a film having a function of attenuating the intensity of transmitting visible light.

When a coloring layer which is a light-transmitting chromatic-color resin layer is used as the interlayer film provided over a thin film transistor, the intensity of incident light on a semiconductor layer of the thin film transistor can be attenuated without reduction in an aperture ratio of a pixel. Accordingly, electric characteristics of the thin film transistor can be prevented from being varied due to photosensitivity of the oxide semiconductor and can be stabilized. Further, the light-transmitting chromatic-color resin layer can function as a color filter layer. In the case of providing a color filter layer on the counter substrate side, precise positional alignment of a pixel region with an element substrate over which a thin film transistor is formed is difficult and accordingly there is a possibility that image quality is degraded. Here, since the interlayer film is formed as the color filter layer directly on the element substrate side, the formation region can be controlled more precisely and this structure is adjustable to a pixel with a fine pattern. In addition, one insulating layer can serve as both the interlayer film and the color filter layer, whereby the process can be simplified and a liquid crystal display device can be manufactured at low cost.

As a technique for realizing a wide viewing angle, a method is used in which a gray scale is controlled by generating an electric field approximately parallel (i.e., in a lateral direction) to a substrate to move liquid crystal molecules in a plane parallel to the substrate. In such a method, an electrode structure used in a fringe field switching (FFS) mode can be used.

In a horizontal electric field mode such as an FFS mode, a first electrode layer in a flat-plate shape (e.g., a pixel electrode layer with which voltage is controlled per pixel) and a second electrode layer having an opening pattern (e.g., a common electrode layer with which common voltage is applied to all pixels) are located below a liquid crystal layer such that the second electrode layer is provided above the first electrode layer so as to overlap the first electrode layer. By applying an electric field between the pixel electrode layer and the common electrode layer, liquid crystal is controlled. An electric field in a lateral direction is applied to the liquid crystal, so that liquid crystal molecules can be controlled using the electric field. That is, since the liquid crystal molecules can be controlled in a direction parallel to the substrates, a wide viewing angle can be obtained. Accordingly, a liquid crystal display device with improved viewing angle characteristics and higher image quality can be provided.

Chromatic colors are colors except achromatic colors such as black, gray, and white. The light-transmitting chromatic-color resin layer is formed using a material which transmits only light of a chromatic color which the material is colored in so as to function as a color filter. As a chromatic color, red, green, blue, or the like can be used. Alternatively, cyan, magenta, yellow, or the like may be used. "Transmitting only light of a chromatic color which a material is colored in" means that light transmitted through the light-transmitting chromatic-color resin layer has a peak at the wavelength of the chromatic color light.

The thickness of the light-transmitting chromatic-color resin layer is preferably controlled as appropriate in consideration of a relation between the concentration of the coloring material to be contained and light transmittance, in order to make the light-transmitting chromatic-color resin layer function as a color filter. In the case of forming the interlayer film by stacking a plurality of thin films, if at least one of the thin films is a light-transmitting chromatic-color resin layer, the interlayer film can function as a color filter.

In the case where the thickness varies depending on the chromatic colors or in the case where there is surface unevenness due to a thin film transistor, an insulating layer which transmits light in a visible wavelength range (so-called colorless and transparent insulating layer) may be stacked for planarization of the surface of the interlayer film. Improvement in planarization of the interlayer film allows favorable coverage with a pixel electrode layer or a common electrode layer to be formed thereover and uniform gap (thickness) of a liquid crystal layer, whereby the visibility of the liquid crystal display device is increased and higher image quality can be achieved.

When a light-blocking layer (black matrix) is used in the interlayer film provided over the thin film transistor, the light-blocking layer can block incident light on the semiconductor layer of the thin film transistor. Thus, electric characteristics of the thin film transistor can be prevented from being varied due to photosensitivity of the oxide semiconductor and can be stabilized. Further, the light-blocking layer can prevent light leakage to an adjacent pixel, which enables higher contrast and higher definition display. Therefore, high definition and high reliability of the liquid crystal display device can be achieved.

Accordingly, an element layer, a pixel electrode layer, a common electrode layer, and an interlayer film (the light-transmitting chromatic-color resin layer) are formed over the same substrate and sealed with a counter substrate which is opposite to the substrate with the liquid crystal layer interposed therebetween. The pixel electrode layer and the common electrode layer are located so as to be stacked with an insulating film (or the interlayer film) interposed therebetween. One of the pixel electrode layer and the common electrode layer is formed in a lower part (a position far from the liquid crystal layer) and has a plate shape. On the other hand, the other electrode layer is formed in an upper part (a position close to the liquid crystal layer) and has various opening patterns such as a pattern with a bend portion or a comb-like shape. In this specification, the electrode layer formed in a lower layer far from the liquid crystal layer (close to the element substrate) is referred to as a first electrode layer, and the first electrode layer has a flat-plate shape. On the hand, the electrode layer formed in an upper layer closed to the liquid crystal layer (far from the element substrate) is referred to as a second electrode layer, and the second electrode layer has an opening pattern (slit). In order to generate an electric field between the pixel electrode layer and the common electrode layer, the electrode layers are located such that the first electrode layer in a flat-plate shape and the opening pattern (slit) of the second electrode layer overlap with each other.

In this specification, the opening pattern (slit) of the pixel electrode layer or the common electrode layer includes a pattern of a comb-like shape which has a partly-opened portion, in addition to a pattern which has an opening in a closed space.

In this specification, a substrate over which a thin film transistor, a pixel electrode layer, a common electrode layer, and an interlayer film are formed is referred to as an element substrate (a first substrate), and a substrate which is positioned opposite from the element substrate with a liquid crystal layer interposed therebetween is referred to as a counter substrate (a second substrate).

The light-blocking layer can be formed on either the counter substrate side or the element substrate side of the liquid crystal display device. Accordingly, improvement in contrast and stabilization of the thin film transistor can be achieved. When the light-blocking layer is formed in a region corresponding to the thin film transistor (at least in a region which overlaps with a semiconductor layer of the thin film transistor), electric characteristics of the thin film transistor can be prevented from being varied due to incident light from the counter substrate. In the case where the light-blocking layer is formed on the counter substrate side, the light-blocking layer may be formed in a region corresponding to the thin film transistor (at least in a region which covers the semiconductor layer of the thin film transistor) with a liquid crystal layer interposed therebetween. In the case where the light-blocking layer is formed on the element substrate side, the light-blocking layer may be formed directly over the thin film transistor (at least in a region which covers the semiconductor layer of the thin film transistor) or formed over the thin film transistor with an insulating layer interposed therebetween.

In the case where the light-blocking layer is also provided on the counter substrate side, there is a case where light from the element substrate and light from the counter substrate toward the semiconductor layer of the thin film transistor can be blocked by a light-blocking wiring layer, electrode layer, or the like. Thus, the light-blocking layer need not always be formed to cover the thin film transistor.

An embodiment of the invention disclosed in this specification includes a thin film transistor in which an oxide semiconductor layer overlapping with a gate electrode layer is a channel formation region, a first electrode layer in a flat-plate shape, a second electrode layer having an opening pattern, an interlayer film provided between the thin film transistor and the second electrode layer, and a liquid crystal layer over the interlayer film, the first electrode layer, and the second electrode layer. One of the first electrode layer and the second electrode layer is a pixel electrode layer which is electrically connected to the thin film transistor, and the other electrode layer is a common electrode. The interlayer film is a light-transmitting chromatic-color resin layer having light transmittance lower than the oxide semiconductor layer. The light-transmitting chromatic-color resin layer is provided so as to overlap with the pixel electrode layer and cover the oxide semiconductor layer.

Another embodiment of the invention disclosed in this specification includes a thin film transistor in which an oxide semiconductor layer overlapping with a gate electrode layer is a channel formation region, a first electrode layer in a flat-plate shape, a second electrode layer having an opening pattern, an interlayer film provided between the thin film transistor and the second electrode layer, and a liquid crystal layer over the interlayer film, the first electrode layer, and the second electrode layer. One of the first electrode layer and the second electrode layer is a pixel electrode layer which is electrically connected to the thin film transistor, and the other electrode layer is a common electrode layer. The interlayer film includes a light-blocking layer and a light-transmitting chromatic-color resin layer having light transmittance lower than the oxide semiconductor layer. The light-blocking layer is provided to cover the oxide semiconductor layer. The light-transmitting chromatic-color resin layer is provided to overlap with the pixel electrode layer.

In this specification, in the case where a liquid crystal display device is a light-transmitting liquid crystal display device (or a semi-transmissive liquid crystal display device) which performs display by transmitting light from a light source, light is needed to be transmitted at least in the pixel region. Thus, all components provided in the pixel region through which light is transmitted: the first substrate; the second substrate; and thin films included in an element layer, such as the pixel electrode layer, the common electrode layer, the insulating film, and the conductive film, have a property of transmitting light in a visible wavelength range.

Note that the ordinal numbers such as "first" and "second" in this specification are used for convenience and do not denote the order of steps and the stacking order of layers. In addition, the ordinal numbers in this specification do not denote particular names which specify the invention.

In this specification, a semiconductor device refers to all types of devices which can function by using semiconductor characteristics. An electro-optical device, a semiconductor circuit, and an electronic device are included in the category of all semiconductor devices.

In a liquid crystal display device which includes a thin film transistor formed by using an oxide semiconductor layer for a channel, an interlayer film which covers at least the oxide semiconductor layer is formed using a material which attenuates the intensity of transmitting visible light. Accordingly, operation characteristics of the thin film transistor can be stabilized without reduction in an aperture ratio.

Further, viewing angle characteristics are improved; thus, a liquid crystal display device with higher image quality can be provided.

DETAILED DESCRIPTION OF THE INVENTION

Figure 1A:
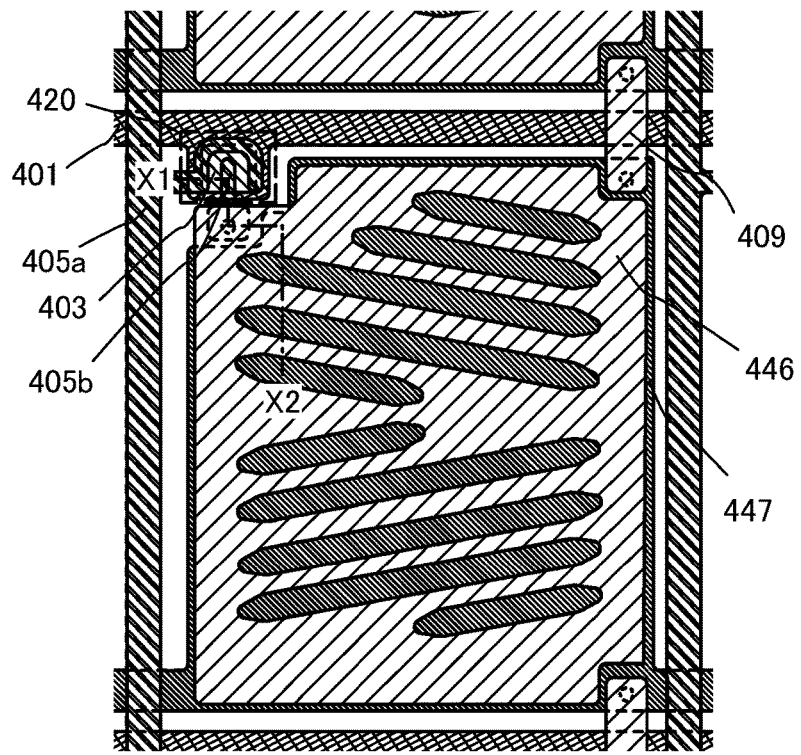
FIGS. 1A and 1B illustrate a liquid crystal display device.

Embodiments will be described with reference to the accompanying drawings. However, the present invention is not limited to the following description, and it will be easily understood by those skilled in the art that various changes and modifications can be made in modes and details without departing from the spirit and scope of the present invention. Therefore, the present invention should not be construed as being limited to the description of the following embodiments. Note that a common reference numeral refers to the same part or a part having a similar function throughout the drawings in the structures described below, and the description thereof is omitted.

Embodiment 1

A liquid crystal display device is described with reference to FIGS. 1A and 1B.

FIG. 1A is a plan view of a liquid crystal display device and illustrates one pixel thereof. FIG. 1B is a cross-sectional view along line X1 to X2 in FIG. 1A.

In FIG. 1A, a plurality of source wiring layers (including a wiring layer 405a) are provided to be in parallel to each other (extended in a vertical direction in the drawing) and apart from each other. A plurality of gate wiring layers (including a gate electrode layer 401) are provided to be extended in a direction generally perpendicular to the source wiring layers (the horizontal direction in the drawing) and apart from each other. Common wiring layers (common electrode layers) are provided adjacent to the respective plurality of gate wiring layers and extended in a direction generally parallel to the gate wiring layers, that is, in a direction generally perpendicular to the source wiring layers (the horizontal direction in the drawing). A roughly rectangular space is surrounded by the source wiring layers, the common wiring layers (common electrode layers), and the gate wiring layers. In this space, a pixel electrode layer and the common electrode layer of the liquid crystal display device are provided. A thin film transistor 420 driving the pixel electrode layer is provided at the upper left corner in the drawing. A plurality of pixel electrode layers and thin film transistors are provided in matrix.

Figure 1B:
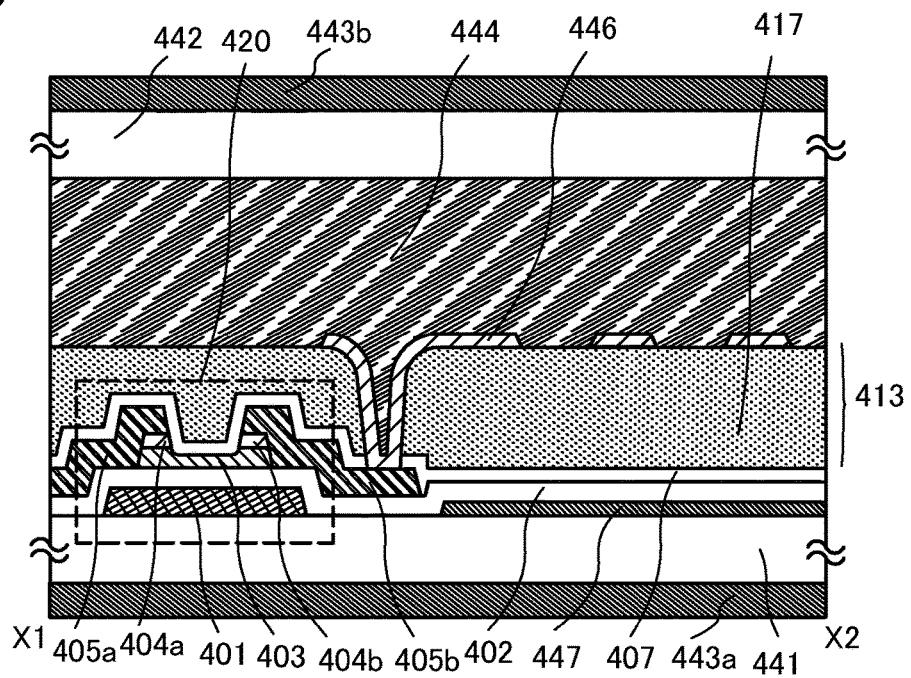

In the liquid crystal display device of FIGS. 1A and 1B, a second electrode layer 446 electrically connected to the thin film transistor 420 functions as a pixel electrode layer, and a first electrode layer 447 electrically connected to the common wiring layer functions as a common electrode layer. Note that as shown in FIGS. 1A and 1B, the first electrode layer 447 also serves as the common wiring layer in the pixel; thus, adjacent pixels are electrically connected to each other with a common electrode layer 409. Note that a capacitor is formed with the pixel electrode layer and the common electrode layer. Although the common electrode layer can operate in a floating state (an electrically isolated state), the potential of the common electrode layer may be set to a fixed potential, preferably to a potential around a common potential (an intermediate potential of an image signal which is transmitted as data) in such a level as not to generate flickers.

A method in which the gray scale is controlled by generating an electric field generally parallel (i.e., in a horizontal direction) to a substrate to move liquid crystal molecules in a plane parallel to the substrate can be used. For such a method, an electrode structure used in an FFS mode illustrated in FIGS. 1A and 1B can be employed.

In a horizontal electric field mode as an FFS mode, the first electrode layer in a flat-plate shape (e.g., a pixel electrode layer with which voltage is controlled per pixel) and the second electrode layer having an opening pattern (e.g., a common electrode layer with which common voltage is applied to all pixels) are located below the liquid crystal layer, such that the second electrode layer is provided above the first electrode layer so as to overlap the first electrode layer. Thus, over a first substrate 441, the first electrode layer and the second electrode layer, one of which is a pixel electrode layer and the other of which is a common electrode layer, are formed, and the pixel electrode layer and the common electrode layer are provided so as to be stacked with an insulating film (or an interlayer insulating film) interposed therebetween. One of the pixel electrode layer and the common electrode layer is formed below the other one and has a flat-plate shape, and the other electrode layer is formed above the one and has various opening patterns such as a pattern with a bend portion or a comb-like shape. The first electrode layer 447 and the second electrode layer 446 do not have the same shape or do not overlap with each other in order to generate an electric field between the electrodes.

In this specification, the electrode layer formed in a lower layer far from the liquid crystal layer (close to the element substrate) is a first electrode layer, and the first electrode layer has a flat-plate shape. On the other hand, the electrode layer formed in an upper layer close to the liquid crystal layer (far from the element substrate) is a second electrode layer, and the second electrode layer has an opening pattern (slit). The first electrode layer in a flat-plate shape and the opening patter (slit) of the second electrode layer overlap with each other in order to generate an electric field between the pixel electrode layer and the common electrode layer.

An electric field is added between the pixel electrode layer and the common electrode layer, so that liquid crystal is controlled. An electric field in a horizontal direction is applied to the liquid crystal, so that liquid crystal molecules can be controlled using the electric field. That is, the liquid crystal molecules aligned in parallel to the substrate can be controlled in a direction parallel to the substrate, whereby a wide viewing angle is obtained.

Examples of the first electrode layers 447 and the second electrode layers 446 are illustrated in FIGS. 8A to 8D. As shown in FIGS. 8A to 8D, first electrode layers 447a to 447d and second electrode layers 446a to 446d are disposed so as to overlap with each other, and insulating films are formed between the first electrode layers 447a to 447d and the second electrode layers 446a to 446d, so that the first electrode layers 447a to 447d and the second electrode layers 446a to 446d are formed over different films.

Figure 8A:
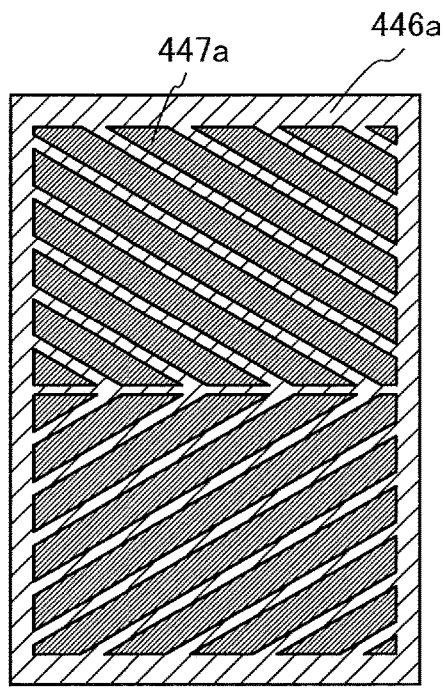
FIGS. 8A to 8D illustrate electrode layers of a liquid crystal display device.
Figure 8B:
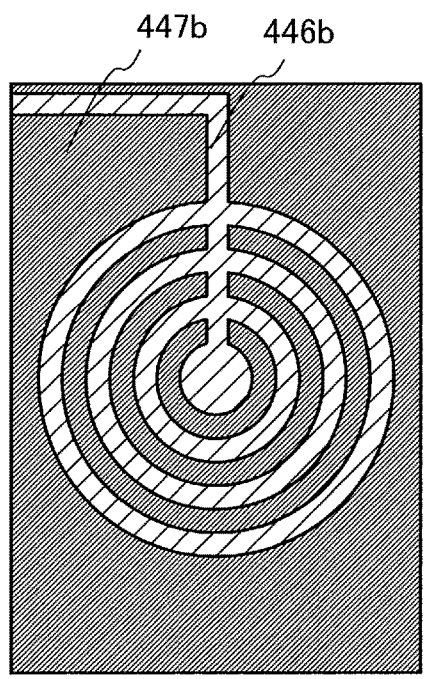
Figure 8C:
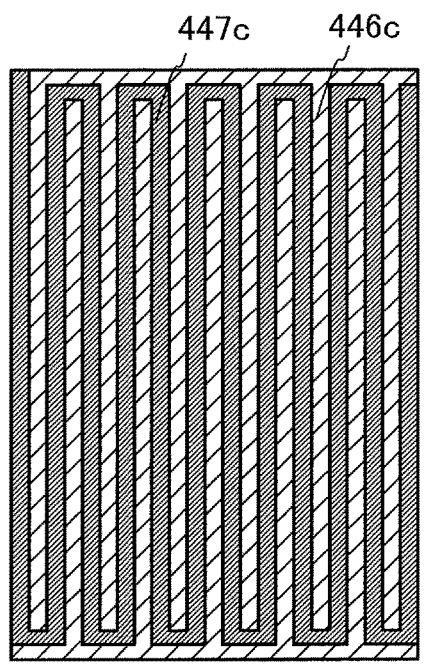
Figure 8D:
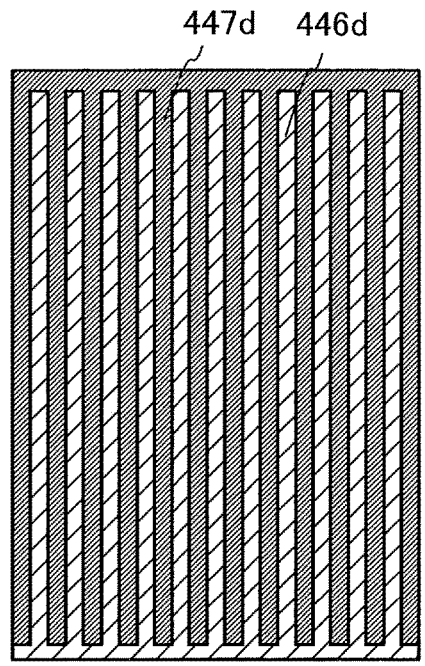

As illustrated in top views of FIGS. 8A to 8D, the second electrode layers 446a to 446d patterned in various shapes are formed over the first electrode layers 447a to 447d. In FIG. 8A, the second electrode layer 446a over the first electrode layer 447a has a V-like shape. In FIG. 8B, the second electrode layer 446b over the first electrode layer 447b has a concentric circular shape. In FIG. 8C, the second electrode layer 446c over the first electrode layer 447c has a comb-like shape such that the electrodes are engaged with each other. In FIG. 8D, the second electrode layer 446d over the first electrode layer 447d has a comb-like shape.

The thin film transistor 420 is an inverted staggered thin film transistor which includes, over the first substrate 441 having an insulating surface, the gate electrode layer 401, a gate insulating layer 402, a semiconductor layer 403, $n^+$ layers 404a and 404b serving as source and drain regions, and the wiring layers 405a and 405b serving as source and drain electrode layers. The first electrode layer 447 is formed in the same layer as the gate electrode layer 401 over the first substrate 441 and is a flat-shaped electrode layer in the pixel.

An insulating film 407 which covers the thin film transistor 420 and is in contact with the semiconductor layer 403 is provided. An interlayer film 413 is provided over the insulating film 407, and over the interlayer film 413, the second electrode layer 446 having an opening pattern is formed. Thus, the first electrode layer 447 and the second electrode layer 446 are provided to overlap with each other with the gate insulating layer 402, the insulating film 407, and the interlayer film 413 interposed therebetween.

As for the interlayer film 413 in the liquid crystal display device of FIGS. 1A and 1B, a light-transmitting chromatic-color resin layer 417 which is a film having a function of attenuating the intensity of transmittance visible light. The light-transmitting chromatic-color resin layer 417 has transmittance of visible light lower than the semiconductor layer 403 which is an oxide semiconductor layer.

When a coloring layer which is the light-transmitting chromatic-color resin layer 417 is used as the interlayer film 413 provided over the thin film transistor 420, the intensity of incident light on the semiconductor layer 403 of the thin film transistor 420 can be attenuated without reduction in an aperture ratio of a pixel. Accordingly, electric characteristics of the thin film transistor 420 can be prevented from being varied due to photosensitivity of the oxide semiconductor and can be stabilized. Further, the light-transmitting chromatic-color resin layer 417 can function as a color filter layer. In the case of providing the color filter layer on the counter substrate side, precise positional alignment of a pixel region with an element substrate over which the thin film transistor is formed is difficult, and accordingly there is a possibility that image quality is degraded. Here, since the interlayer film is formed as the color filter layer directly on the element substrate side, the formation region can be controlled more precisely and this structure is adjustable to a pixel with a fine pattern. In addition, one insulating layer serves as both the interlayer film and the color filter layer, whereby the process can be simplified and a liquid crystal display device can be manufactured at low cost.

Chromatic colors are colors except achromatic colors such as black, gray, and white. The coloring layer is formed using a material which transmits only light of a chromatic color which the material is colored in so as to function as the color filter. As chromatic color, red, green, blue, or the like can be used. Alternatively, cyan, magenta, yellow, or the like may also be used. "Transmitting only light of a chromatic color which a material is colored in" means that light transmitted through the coloring layer has a peak at the wavelength of the chromatic color light.

The thickness of the light-transmitting chromatic-color resin layer is preferably controlled as appropriate in consideration of a relation between the concentration of the coloring material to be contained and light transmittance, in order to make the light-transmitting chromatic-color resin layer function as a color filter layer. In the case of forming the interlayer film by stacking a plurality of thin films, if at least one of the thin films is a light-transmitting chromatic-color resin layer, the interlayer film can function as a color filter.

In the case where the thickness of the light-transmitting chromatic-color resin layer differs in accordance with the chromatic colors or in the case where there is surface unevenness due to a light-blocking layer or the thin film transistor, an insulating layer which transmits light in a visible wavelength range (so-called colorless and transparent insulating layer) may be stacked for planarization of the surface of the interlayer film. Improvement in planarization of the interlayer film allows favorable coverage with the pixel electrode layer or the common electrode layer to be formed thereover and uniform gap (thickness) of the liquid crystal layer, whereby the visibility of the liquid crystal display device is increased and higher image quality can be achieved.

As formation of the light-transmitting chromatic-color resin layer 417, a light-transmitting organic resin, a chromatic pigment, or a dye can be used, and an organic resin in which a pigment, a dye, or the like is mixed may be used. As the light-transmitting organic resin, a photosensitive or non-photosensitive resin can be used. Use of the photosensitive organic resin layer makes it possible to reduce the number of resist masks; thus, the steps are simplified, which is preferable. In addition, since a contact hole formed in the interlayer film has an opening shape with a curvature, coverage with a film such as an electrode layer formed in the contact hole can be improved.

There is no particular limitation on the formation method of the interlayer film 413 (the light-transmitting chromatic-color resin layer 417). In accordance with the material, a wet method such as spin coating, dip coating, spray coating, or droplet discharging (e.g., ink jetting, screen printing, or offset printing) may be performed, and the formed film may be patterned into a desired shape by an etching method (dry etching or wet etching method) if necessary.

A liquid crystal layer 444 is provided over the first electrode layer 447 and the second electrode layer 446 and sealed with a second substrate 442 which is a counter substrate.

The first substrate 441 and the second substrate 442 are light-transmitting substrates and are provided with a polarizing plate 443a and a polarizing plate 443b respectively on their outer sides (the sides opposite from the side where the liquid crystal layer 444 is provided).

The first electrode layer 447 and the second electrode layer 446 can be formed using a light-transmitting conductive material such as indium oxide containing tungsten oxide, indium zinc oxide containing tungsten oxide, indium oxide containing titanium oxide, indium tin oxide containing titanium oxide, indium tin oxide (hereinafter referred to as ITO), indium zinc oxide, or indium tin oxide to which silicon oxide is added.

A conductive composition containing a conductive high molecule (also referred to as a conductive polymer) can be used to form the first electrode layer 447 and the second electrode layer 446. The pixel electrode formed using the conductive composition preferably has a sheet resistance of 10000 Ω/square or less and a transmittance of 70% or more at a wavelength of 550 nm. Furthermore, the resistivity of the conductive high molecule contained in the conductive composition is preferably 0.1 Ω·cm or less.

As the conductive high molecule, a so-called π-electron conjugated conductive polymer can be used. For example, it is possible to use polyaniline or a derivative thereof, polypyrrole or a derivative thereof, polythiophene or a derivative thereof, or a copolymer of two or more kinds of them.

An insulating film serving as a base film may be provided between the first substrate 441, and the gate electrode layer 401 and the first electrode layer 447. The base film functions to prevent diffusion of an impurity element from the first substrate 441 and can be formed using one film or stacked films selected from a silicon nitride film, a silicon oxide film, a silicon nitride oxide film, and a silicon oxynitride film. The gate electrode layer 401 can be formed to have a single-layer structure or a stacked structure using a metal material such as molybdenum, titanium, chromium, tantalum, tungsten, aluminum, copper, neodymium, or scandium or an alloy material which contains any of these materials as its main component. By using a light-blocking conductive film as the gate electrode layer 401, light from a backlight (light emitted through the first substrate 441) can be prevented from entering the semiconductor layer 403.

For example, as a two-layer structure of the gate electrode layer 401, the following structures are preferable: a two-layer structure of an aluminum layer and a molybdenum layer stacked thereover, a two-layer structure of a copper layer and a molybdenum layer stacked thereover, a two-layer structure of a copper layer and a titanium nitride layer or a tantalum nitride layer stacked thereover, and a two-layer structure of a titanium nitride layer and a molybdenum layer. As a three-layer structure, a stack of a tungsten layer or a tungsten nitride layer, a layer of an alloy of aluminum and silicon or an alloy of aluminum and titanium, and a titanium nitride layer or a titanium layer is preferable.

The gate insulating layer 402 can be formed to have a single-layer structure or a stacked structure using a silicon oxide layer, a silicon nitride layer, a silicon oxynitride layer, or a silicon nitride oxide layer by a plasma CVD method, a sputtering method, or the like. Alternatively, the gate insulating layer 402 can be formed using a silicon oxide layer by a CVD method using an organosilane gas. As the organosilane gas, a silicon-containing compound such as tetraethoxysilane (TEOS: chemical formula, $Si(OC_2H_5)_4$), tetramethylsilane (TMS: chemical formula, $Si(CH_3)_4$), tetramethylcyclotetrasiloxane (TMCTS), octamethylcyclotetrasiloxane (OMCTS), hexamethyldisilazane (HMDS), triethoxysilane ($SiH(OC_2H_5)_3$), or trisdimethylaminosilane ($SiH(N(CH_3)_2)_3$) can be used.

It is preferable that reverse sputtering in which an argon gas is introduced to generate plasma be performed before the formation of the oxide semiconductor film used as the semiconductor layer 403 in order to remove dust attached to a surface of the gate insulating layer. Note that instead of an argon atmosphere, a nitrogen atmosphere, a helium atmosphere, or the like may be used. Alternatively, an argon atmosphere to which oxygen, hydrogen, $N_2O$, or the like is added may be used. Further alternatively, an argon atmosphere to which $Cl_2$, $CF_4$, or the like is added may be used.

In this specification, a thin film represented by $InMO_3(ZnO)_m$ (m>0) is preferably used as an oxide semiconductor. In the thin film transistor 420, a thin film represented by $InMO_3(ZnO)_m$ (m>0) is formed, and the thin film is used as the semiconductor layer 403. Note that M denotes one or more of metal elements selected from gallium (Ga), iron (Fe), nickel (Ni), manganese (Mn), and cobalt (Co). In addition to a case where only Ga is contained as M, there is a case where Ga and the above metal elements other than Ga are contained as M, for example, M contains Ga and Ni or Ga and Fe. Moreover, in the oxide semiconductor, in some cases, a transition metal element such as Fe or Ni or an oxide of the transition metal is contained as an impurity element in addition to a metal element contained as M. For example, an In—Ga—Zn—O-based non-single-crystal film can be used.

In the case where M is gallium (Ga) in the $InMO_3(ZnO)_m$ (m>0) film (layer), this thin film is referred to as an In—Ga—Zn—O-based non-single-crystal film in this specification. Even in the case where after film formation by sputtering using a target of $In_2O_3:Ga_2O_3:ZnO=1:1:1$, the In—Ga—Zn—O-based non-single-crystal film is subjected to heat treatment at 200° C. to 500° C., typically 300° C. to 400° C. for 10 minutes to 100 minutes, an amorphous structure is observed in the In—Ga—Zn—O-based non-single-crystal film by X-ray diffraction (XRD) spectrometry. Further, a thin film transistor having electric characteristics such as an on/off ratio of $10^9$ or higher and mobility of 10 or higher at a gate voltage of ±20 V can be manufactured. In addition, the In—Ga—Zn—O-based non-single-crystal film formed by sputtering has photosensitivity at a wavelength of 450 nm or less.

The semiconductor layer 403 and the $n^+$ layers 404a and 404b serving as source and drain regions can be formed using an In—Ga—Zn—O-based non-single-crystal film. The $n^+$ layers 404a and 404b are oxide semiconductor layers having a resistance lower than the semiconductor layer 403. For example, the $n^+$ layers 404a and 404b have n-type conductivity and an activation energy ($\Delta E$) of from 0.01 eV to 0.1 eV inclusive. The $n^+$ layers 404a and 404b are In—Ga—Zn—O-based non-single-crystal films and include at least an amorphous component. The $n^+$ layers 404a and 404b may include crystal grains (nanocrystals) in an amorphous structure. These crystal grains (nanocrystals) in the $n^+$ layers 404a and 404b each have a diameter of 1 nm to 10 nm, typically about 2 nm to 4 nm.

Provision of the $n^+$ layers 404a and 404b can make a good junction between the wiring layers 405a and 405b which are metal layers and the semiconductor layer 403 which is an oxide semiconductor layer, which allows higher thermal stability than in the case of providing Schottky junction. In addition, willing provision of the $n^+$ layer is effective in supplying carriers to the channel (on the source side), stably absorbing carriers from the channel (on the drain side), or preventing a resistance component from being formed at an interface between the wiring layer and the semiconductor layer. Moreover, since resistance is reduced, high mobility can be ensured even with a high drain voltage.

A first In—Ga—Zn—O-based non-single-crystal film used as the semiconductor layer 403 is formed under deposition conditions different from those for formation of a second In—Ga—Zn—O based non-single-crystal film which is used as the $n^+$ layers 404a and 404b. For example, a flow rate ratio of an oxygen gas to an argon gas in formation condition of the first In—Ga—Zn—O-based non-single-crystal film is made higher than a flow rate ratio of an oxygen gas to an argon gas in formation condition of the second In—Ga—Zn—O-based non-single-crystal film. Specifically, the second In—Ga—Zn—O-based non-single-crystal film is formed in a rare gas (e.g., argon or helium) atmosphere (or an atmosphere containing an oxygen gas of 10% or lower and an argon gas containing 90% or higher), and the first In—Ga—Zn—O-based non-single-crystal film is formed in an oxygen atmosphere (or an atmosphere in which a flow rate of oxygen gas is equal to or higher than a flow rate of argon gas).

For example, the first In—Ga—Zn—O-based non-single-crystal film used as the semiconductor layer 403 is formed under the conditions where the oxide semiconductor target including In, Ga, and Zn (composition ratio is $In_2O_3:Ga_2O_3:ZnO=1:1:1$) with a diameter of 8 inches is used, the distance between the substrate and the target is set at 170 mm, the pressure is set at 0.4 Pa, and the direct current (DC) power supply is set at 0.5 kW. Note that a pulse direct current (DC) power supply is preferable because dust can be reduced and the film thickness can be uniform. The thickness of the first In—Ga—Zn—O-based non-single-crystal film is set to 5 nm to 200 nm.

On the other hand, the second In—Ga—Zn—O-based non-single-crystal film used as the $n^+$ layers 404a and 404b is formed by a sputtering method using the target ($In_2O_3:Ga_2O_3:ZnO=1:1:1$), under the conditions where the pressure is set at 0.4 Pa, the power is 500 W, the deposition temperature is room temperature, and an argon gas is introduced at a flow rate of 40 sccm. An In—Ga—Zn—O based non-single-crystal film including crystal grains with a size of 1 nm to 10 nm immediately after the film formation is formed in some cases. Note that it can be said that the presence or absence of crystal grains or the density of crystal grains can be adjusted and the diameter size can be adjusted within the range of 1 nm to 10 nm by appropriate adjustment of the reactive sputtering deposition conditions such as the composition ratio in the target, the film deposition pressure (0.1 to 2.0 Pa), the power (250 W to 3000 W: 8 inches $\phi$), the temperature (room temperature to 100° C.), or the like. The second In—Ga—Zn—O-based non-single-crystal film has a thickness of 5 nm to 20 nm. Needless to say, when the film includes crystal grains, the size of the crystal grains does not exceed the thickness of the film. The thickness of the second In—Ga—Zn—O-based non-single-crystal film is 5 nm.

Examples of a sputtering method include an RF sputtering method in which a high-frequency power source is used as a sputtering power source, a DC sputtering method, and a pulsed DC sputtering method in which a bias is applied in a pulsed manner. An RF sputtering method is mainly used in the case where an insulating film is formed, and a DC sputtering method is mainly used in the case where a metal film is formed.

In addition, there is also a multi-source sputtering apparatus in which a plurality of targets of different materials can be set. With the multi-source sputtering apparatus, films of different materials can be formed to be stacked in the same chamber, or a film of plural kinds of materials can be formed by electric discharge at the same time in the same chamber.

Further, as a sputtering apparatus, there are a sputtering apparatus provided with a magnet system inside the chamber and used for a magnetron sputtering method, and a sputtering apparatus used for an ECR sputtering method in which plasma is generated with the use of not glow discharge but microwaves is used.

In addition, as a film formation method by sputtering, there are also a reactive sputtering method in which a target substance and a sputtering gas component are chemically reacted with each other during film formation to form a thin compound film thereof, and a bias sputtering method in which voltage is also applied to a substrate during film formation.

In the manufacturing process of the semiconductor layer, the $n^+$ layers, and the wiring layers, an etching step is used to process thin films into desired shapes. Dry etching or wet etching can be used for the etching step.

As an etching gas used for dry etching, a gas containing chlorine (a chlorine-based gas such as chlorine ($Cl_2$), boron chloride ($BCl_3$), silicon chloride ($SiCl_4$), or carbon tetrachloride ($CCl_4$)) is preferably used.

Alternatively, a gas containing fluorine (a fluorine-based gas such as carbon tetrafluoride ($CF_4$), sulfur fluoride ($SF_6$), nitrogen fluoride ($NF_3$), or trifluoromethane ($CHF_3$)), hydrogen bromide (HBr), oxygen ($O_2$), any of these gases to which a rare gas such as helium (He) or argon (Ar) is added, or the like can be used.

As an etching apparatus used for dry etching, an etching apparatus that uses reactive ion etching (RIE), or a dry etching apparatus that uses a high-density plasma source such as an electron cyclotron resonance (ECR) source or an inductively coupled plasma (ICP) source can be used. As such a dry etching apparatus with which uniform discharge can be easily obtained over a large area as compared to an ICP etching apparatus, there is an enhanced capacitively coupled plasma (ECCP) mode etching apparatus in which an upper electrode is grounded, a high-frequency power source of 13.56 MHz is connected to a lower electrode, and further a low-frequency power source of 3.2 MHz is connected to the lower electrode. This ECCP mode etching apparatus can be used even in the case where a substrate having the size exceeding 3 meters of the tenth generation is used, for example.

In order to etch the films into desired shapes, etching conditions (e.g., the amount of electric power applied to a coiled electrode, the amount of electric power applied to an electrode on a substrate side, or the electrode temperature on the substrate side) are controlled as appropriate.

As an etchant used for wet etching, a mixed solution of phosphoric acid, acetic acid, and nitric acid, an ammonia peroxide mixture (hydrogen peroxide:ammonia:water=5:2:2), or the like can be used. Alternatively, ITO-07N (produced by Kanto Chemical Co., Inc.) may be used.

The etchant after the wet etching is removed by cleaning, together with the etched material. The waste liquid of the etchant including the etched material may be purified so that the included material is reused. If a material such as indium included in the oxide semiconductor layer is collected from the waste liquid of the etching and reused, resources can be used effectively and cost can be reduced.

In order to etch the films into desired shapes, etching conditions (e.g., etchant, etching time, temperature, or the like) are controlled as appropriate in accordance with the material.

As a material of the wiring layers 405$a$ and 405$b$, an element selected from Al, Cr, Ta, Ti, Mo, and W, an alloy containing any of the elements as its component, an alloy containing any of the elements in combination, and the like can be given. Further, in the case of performing heat treatment at 200° C. to 600° C., the conductive film preferably has heat resistance against such heat treatment. Since Al itself has disadvantages such as low heat resistance and a tendency to be corroded, it is used in combination with a conductive material having heat resistance. As a conductive material having heat resistance which is combined with Al, an element selected from titanium (Ti), tantalum (Ta), tungsten (W), molybdenum (Mo), chromium (Cr), neodymium (Nd), or scandium (Sc), or an alloy including any of the elements, an alloy film including a combination of such elements, or a nitride film including any of the elements can be used.

The gate insulating layer 402, the semiconductor layer 403, the n$^+$ layers 404$a$ and 404$b$, and the wiring layers 405$a$ and 405$b$ may be formed in succession without being exposed to air. By successive formation without exposure to air, each interface between the stacked layers can be formed without being contaminated by atmospheric components or contaminating impurities contained in air; therefore, variation in characteristics of the thin film transistor can be reduced.

Note that the semiconductor layer 403 is partly etched so as to have a groove (a depressed portion).

The semiconductor layer 403 and the n$^+$ layers 404$a$ and 404$b$ are preferably subjected to heat treatment at 200° C. to 600° C., typically 300° C. to 500° C. For example, heat treatment is performed for 1 hour at 350° C. in a nitrogen atmosphere. By this heat treatment, rearrangement at the atomic level is caused in the In—Ga—Zn—O based oxide semiconductor which forms the semiconductor layer 403 and the n$^+$ layers 404$a$ and 404$b$. This heat treatment (also including photo-annealing or the like) is important in that the distortion that interrupts carrier transfer in the semiconductor layer 403 and the n$^+$ layers 404$a$ and 404$b$ can be reduced. Note that there is no particular limitation on when to perform the heat treatment, as long as it is performed after the semiconductor layer 403 and the n$^+$ layers 404$a$ and 404$b$ are formed.

In addition, oxygen radical treatment may be performed on the exposed depression portion of the semiconductor layer 403. The radical treatment is preferably performed in an atmosphere of $O_2$ or $N_2O$, or an atmosphere of $N_2$, He, Ar, or the like which includes oxygen. Alternatively, an atmosphere obtained by adding $Cl_2$ or $CF_4$ to the above atmosphere may be used. Note that the radical treatment is preferably performed with no bias voltage applied to the first substrate 441 side.

Note that there is no particular limitation on a structure of the thin film transistor formed in the liquid crystal display device. The thin film transistor may have a single-gate structure in which one channel formation region is formed, a double-gate structure in which two channel formation regions are formed, or a triple-gate structure in which three channel formation regions are formed. In addition, the transistor in the peripheral driver circuit region may also have a single-gate structure, a double-gate structure, or a triple-gate structure.

The thin film transistor may have a top-gate structure (e.g., a staggered structure or a coplanar structure), a bottom-gate structure (e.g., an inverted-staggered structure or an inverted-coplanar structure), a dual-gate structure including two gate electrode layers provided above and below a channel region each with a gate insulating film interposed therebetween, or other structures.

An alignment film or an optical film such as a polarizing plate, a retardation plate, or an anti-reflection film is provided as appropriate. For example, circular polarization by the polarizing plate and the retardation plate may be used. In addition, a backlight, a side light, or the like may be used as a light source.

The insulating film 407 covering the thin film transistor 420 can be formed using an inorganic insulating film or organic insulating film formed by a wet method or a dry method. For example, the insulating film 407 can be formed by a CVD method, a sputtering method, or the like, using a silicon nitride film, a silicon oxide film, a silicon oxynitride film, an aluminum oxide film, a tantalum oxide film, or the like. Alternatively, an organic material such as acrylic, polyimide, benzocyclobutene, polyamide, or an epoxy resin can be used. Other than such organic materials, it is also possible to use a low-dielectric constant material (a low-k material), a siloxane-based resin, PSG (phosphosilicate glass), BPSG (borophosphosilicate glass), or the like.

Note that a siloxane-based resin is a resin formed from a siloxane-based material as a starting material and having the bond of Si—O—Si. A siloxane-based resin may include, as a substituent, an organic group (e.g., an alkyl group, and an aryl group) or a fluoro group. The organic group may include a fluoro group. A siloxane-based resin is applied by a coating method and baked; thus, the insulating film 407 can be formed.

Alternatively, the insulating film 407 may be formed by stacking plural insulating films formed using any of these materials. For example, the insulating film 407 may have such a structure that an organic resin film is stacked over an inorganic insulating film.

As a liquid crystal material of the liquid crystal layer 444, various kinds of liquid crystal can be used, and lyotropic liquid crystal, thermotropic liquid crystal, low molecular liquid crystal, high molecular liquid crystal, discotic liquid crystal, ferroelectric liquid crystal, anti-ferroelectric liquid crystal, or the like may be selected as appropriate to be used.

In this specification, in the case where a liquid crystal display device is a light-transmitting liquid crystal display device (or a semi-transmissive liquid crystal display device) which performs display by transmitting light from a light source, light is needed to be transmitted at least in the pixel region. Thus, all components provided in the pixel region through which light is transmitted: the first substrate; the second substrate; and thin films included in an element layer, such as the pixel electrode layer, the common electrode layer, the insulating film, and the conductive film have a property of transmitting light in a visible wavelength range.

As for the first substrate 441 and the second substrate 442, a glass substrate of barium borosilicate glass, aluminoborosilicate glass, or the like; a quartz substrate; a plastic substrate; or the like can be used.

Further, by use of a resist mask having regions with plural thicknesses (typically, two different thicknesses) which is formed using a multi-tone mask, the number of resist masks can be reduced, resulting in simplified process and lower costs.

Improvement in contrast and viewing angle characteristics enables a liquid crystal display device with higher image quality to be supplied. Further, such a liquid crystal display device can be manufactured at low cost with high productivity.

Further, characteristics of the thin film transistor can be stabilized; thus, reliability of the liquid crystal display device can be improved.

Embodiment 2

Figure 3A:
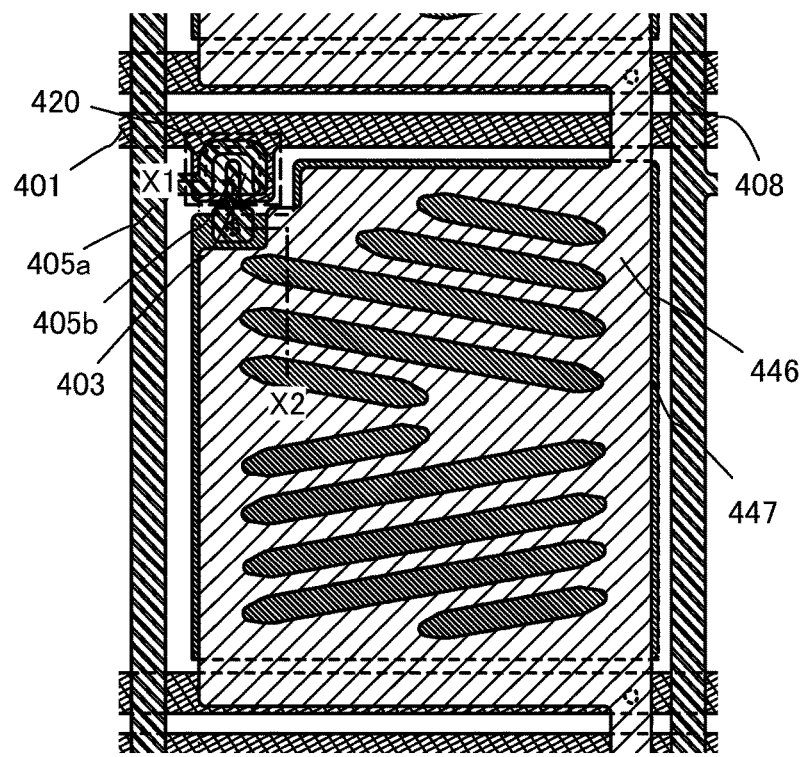
FIGS. 3A and 3B illustrate a liquid crystal display device.
Figure 3B:
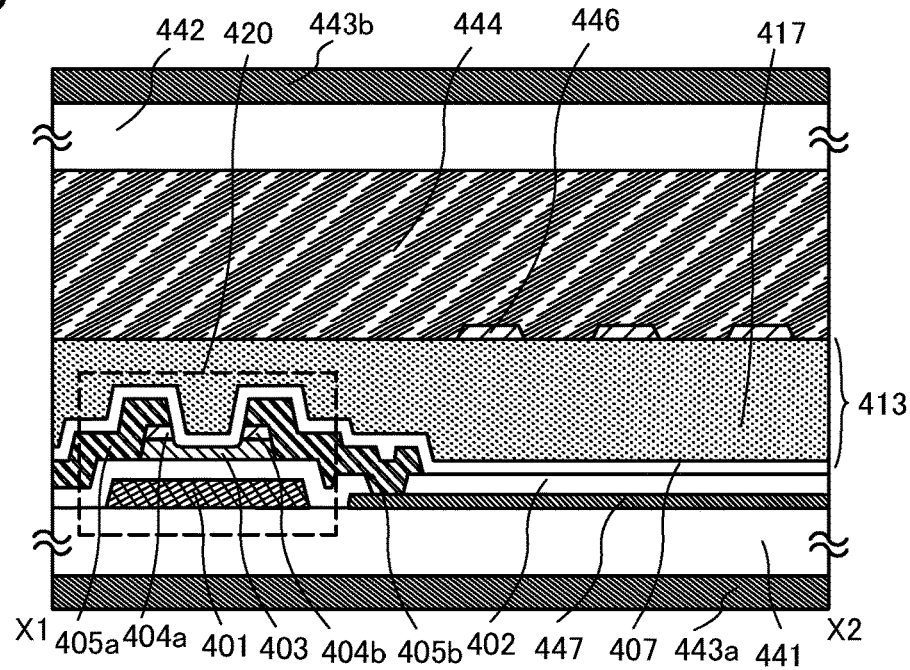

Another mode of a liquid crystal display device is illustrated in FIGS. 3A and 3B. Specifically, an example of a liquid crystal display device is described, in which a first electrode layer in a flat-plate shape formed in a lower layer is used as a pixel electrode layer, and a second electrode layer having an opening pattern formed in an upper layer is used as a common electrode layer. Note that components in common with those in Embodiment 1 can be formed using the similar material and the similar manufacturing method, and detailed description of the same portions and portions which have similar functions is omitted.

FIG. 3A is a plan view of a liquid crystal display device and illustrates one pixel thereof. FIG. 3B is a cross-sectional view along line X1 to X2 in FIG. 3A.

In FIG. 3A, a plurality of source wiring layers (including the wiring layer 405a) are provided in parallel to each other (extended in a vertical direction in the drawing) and apart from each other. A plurality of gate wiring layers (including the gate electrode layer 401) are provided apart from each other and extended in a direction generally perpendicular to the source wiring layers (a horizontal direction in the drawing). Common wiring layers 408 are provided adjacent to the respective plurality of gate wiring layers and extended in a direction generally parallel to the gate wiring layers, that is, in a direction generally perpendicular to the source wiring layers (a horizontal direction in the drawing). A roughly rectangular space is surrounded by the source wiring layers, the common wiring layers 408, and the gate wiring layers. In this space, a pixel electrode layer and a common electrode layer of the liquid crystal display device are provided. The thin film transistor 420 for driving the pixel electrode layer is provided at the upper left corner in the drawing. A plurality of pixel electrode layers and thin film transistors are provided in matrix.

In FIGS. 3A and 3B, the first electrode layer 447 electrically connected to the thin film transistor 420 functions as a pixel electrode layer, and the second electrode layer 446 electrically connected to the common wiring layer functions as a common electrode layer. The first electrode layer 447 is electrically connected to the thin film transistor 420 through a contact hole formed in the gate insulating layer 402. The second electrode layer 446 is electrically connected to the common wiring layer 408 through a contact hole formed in the gate insulating layer 402, the insulating film 407, and the interlayer film 413.

When a coloring layer which is the light-transmitting chromatic-color resin layer 417 is used as the interlayer film 413 provided over the thin film transistor 420, the intensity of incident light on the semiconductor layer 403 of the thin film transistor 420 can be attenuated without reduction in an aperture ratio of a pixel. Accordingly, electric characteristics of the thin film transistor 420 can be prevented from being varied due to photosensitivity of the oxide semiconductor and can be stabilized. Further, the light-transmitting chromatic-color resin layer 417 can function as a color filter layer. In the case of providing the color filter layer on the counter substrate side, precise positional alignment of a pixel region with an element substrate over which the thin film transistor is formed is difficult, and accordingly there is a possibility that image quality is degraded. Here, since the interlayer film is formed as the color filter layer directly on the element substrate side, the formation region can be controlled more precisely and this structure is adjustable to a pixel with a fine pattern. In addition, one insulating layer serves as both the interlayer film and the color filter layer, whereby the process can be simplified and a liquid crystal display device can be manufactured at low cost.

Improvement in contrast and viewing angle characteristics enables a liquid crystal display device with higher image quality to be supplied. Further, such a liquid crystal display device can be manufactured at low cost with high productivity.

Further, characteristics of the thin film transistor can be stabilized; thus, reliability of the liquid crystal display device can be improved.

Embodiment 3

Other modes of liquid crystal display devices are illustrated in FIGS. 4A and 4B and FIGS. 7A and 7B. Specifically, structural examples are described, in each of which a first electrode layer is provided above a thin film transistor. Note that components in common with those in Embodiments 1 and 2 can be formed using the similar material and the similar manufacturing method, and detailed description of the same portions and portions which have similar functions is omitted.

Figure 4A:
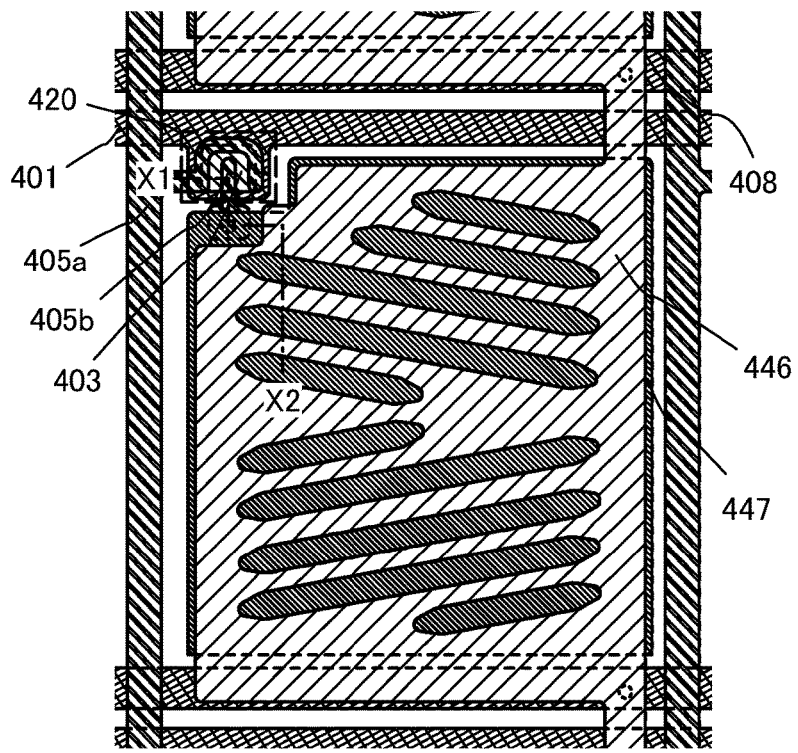
FIGS. 4A and 4B illustrate a liquid crystal display device.
Figure 4B:
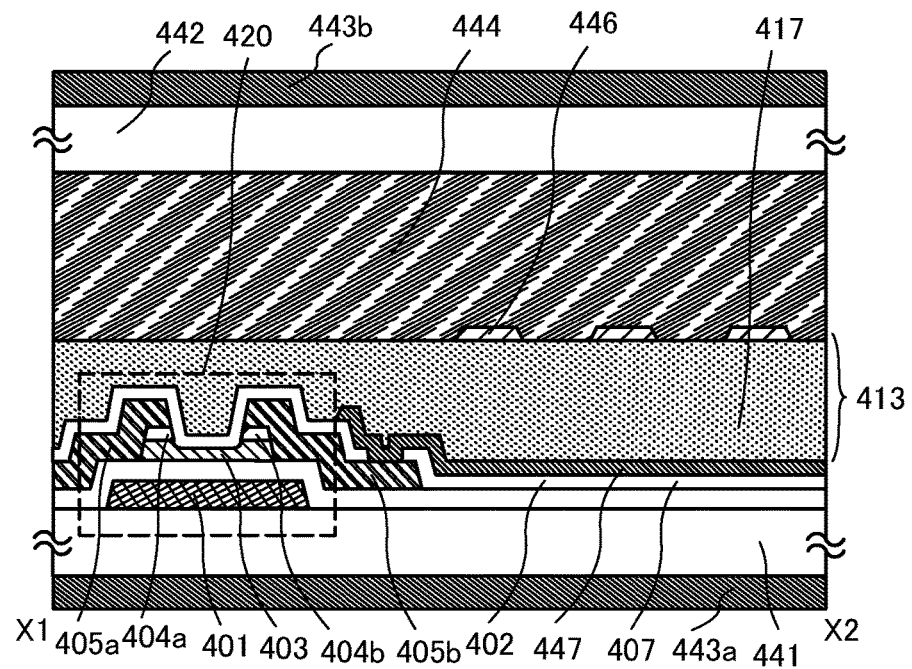
Figure 7A:
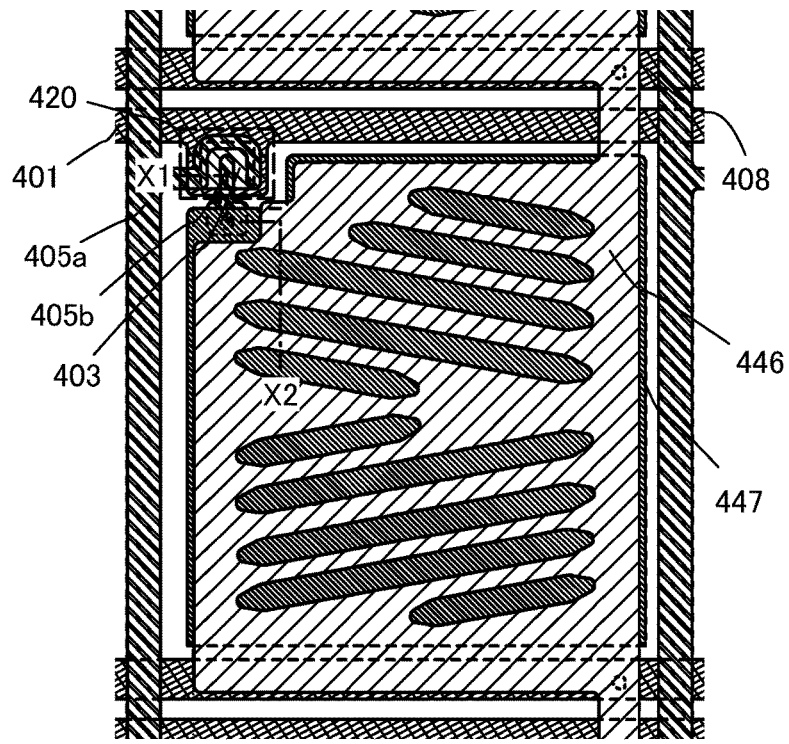
FIGS. 7A and 7B illustrate a liquid crystal display device.
Figure 7B:
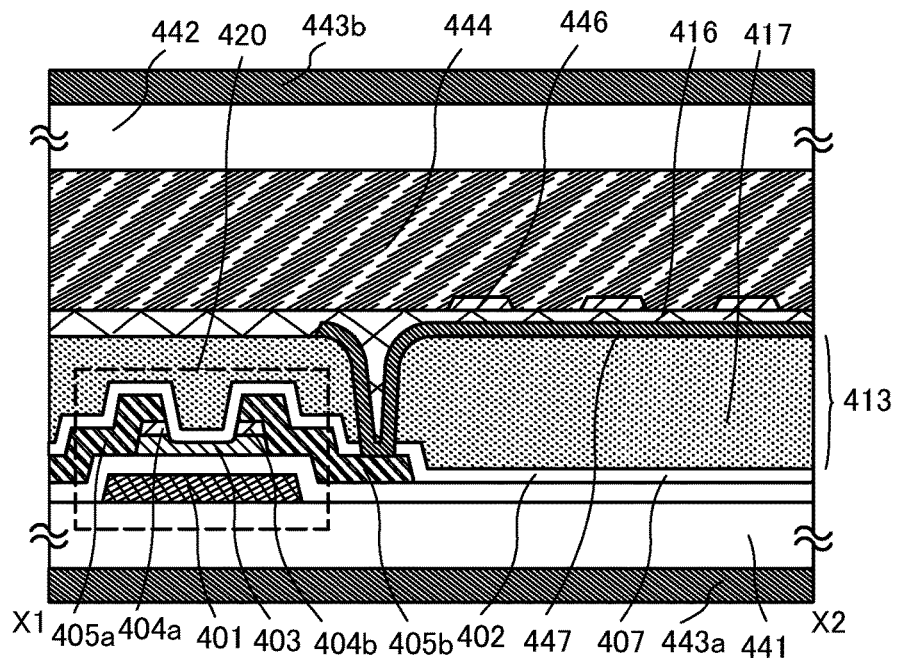

FIG. 4A and FIG. 7A are each a plan view of a liquid crystal display device and each illustrate one pixel. FIG. 4B and FIG. 7B are cross-sectional views of FIG. 4A and FIG. 7A along line X1 to X2, respectively.

In each plan view of FIG. 4A and FIG. 7A, in a manner similar to Embodiment 2, a plurality of source wiring layers (including the wiring layer 405a) are provided in parallel to each other (extended in a vertical direction in the drawing) and apart from each other. A plurality of gate wiring layers (including the gate electrode layer 401) are provided apart from each other and extended in a direction generally perpendicular to the source wiring layers (a horizontal direction in the drawing). The common wiring layers 408 are provided adjacent to the respective plurality of gate wiring layers and extended in a direction generally parallel to the gate wiring layers, that is, in a direction generally perpendicular to the source wiring layers (a horizontal direction in the drawing). A roughly rectangular space is surrounded by the source wiring layers, the common wiring layers 408, and the gate wiring layers. In this space, a pixel electrode layer and a common electrode layer of the liquid crystal display device are provided. The thin film transistor 420 for driving the pixel electrode layer is provided at the upper left corner in the drawing. A plurality of pixel electrode layers and thin film transistors are provided in matrix.

In each liquid crystal display device of FIG. 4B and FIG. 7B, the first electrode layer 447 in a flat-plate shape which is electrically connected to the thin film transistor 420 functions as a pixel electrode layer. The second electrode layer 446 having an opening pattern which is electrically connected to the common wiring layer 408 functions as a common electrode layer.

In FIGS. 4A and 4B, the first electrode layer 447 is formed over the insulating film 407, the interlayer film 413 is stacked over the first electrode layer 447, and the second electrode layer 446 is formed over the interlayer film 413. Note that in FIGS. 4A and 4B, a capacitor is formed with the first electrode layer and the common electrode layer.

In FIGS. 7A and 7B, the first electrode layer 447 is formed over the interlayer film 413, an insulating film 416 is stacked over the first electrode layer 447, and the second electrode layer 446 is formed over the insulating film 416. Note that in FIGS. 7A and 7B, a capacitor is formed with the first electrode layer and the common electrode layer.

When a coloring layer which is the light-transmitting chromatic-color resin layer 417 is used as the interlayer film 413 provided over the thin film transistor 420, the intensity of incident light on the semiconductor layer 403 of the thin film transistor 420 can be attenuated without reduction in an aperture ratio of a pixel. Accordingly, electric characteristics of the thin film transistor 420 can be prevented from being varied due to photosensitivity of the oxide semiconductor and can be stabilized. Further, the light-transmitting chromatic-color resin layer 417 can function as a color filter layer. In the case of providing the color filter layer on the counter substrate side, precise positional alignment of a pixel region with an element substrate over which the thin film transistor is formed is difficult, and accordingly there is a possibility that image quality is degraded. Here, since the interlayer film is formed as the color filter layer directly on the element substrate side, the formation region can be controlled more precisely and this structure is adjustable to a pixel with a fine pattern. In addition, one insulating layer can serve as both the interlayer film and the color filter layer, whereby the process can be simplified and a liquid crystal display device can be manufactured at low cost.

Improvement in contrast and viewing angle characteristics enables a liquid crystal display device with higher image quality to be supplied. Further, such a liquid crystal display device can be manufactured at low cost with high productivity.

Further, characteristics of the thin film transistor can be stabilized; thus, reliability of the liquid crystal display device can be improved.

Embodiment 4

A liquid crystal display device including a light-blocking layer (black matrix) is described with reference to FIGS. 5A and 5B.

Figure 5A:
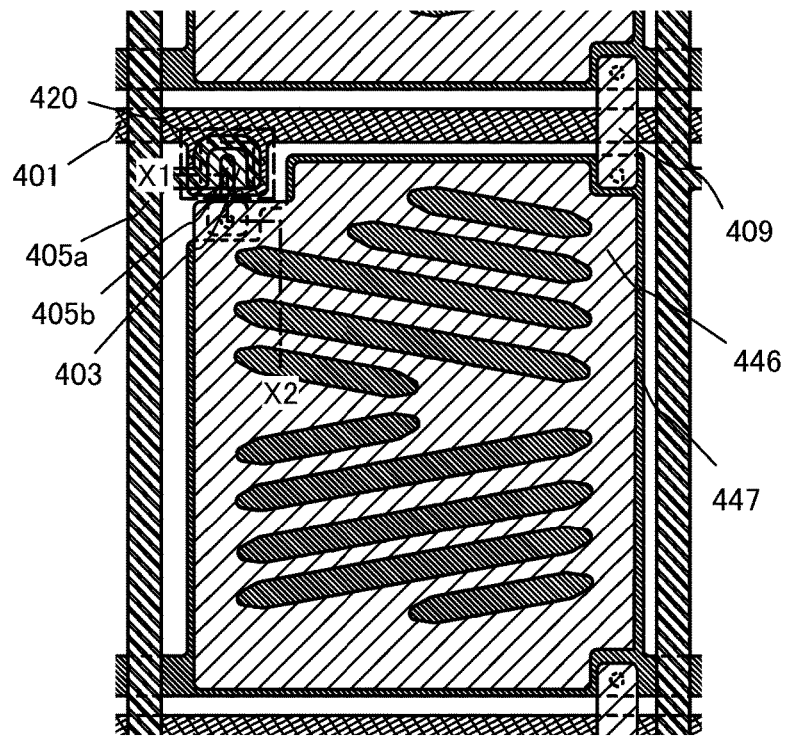
FIGS. 5A and 5B illustrate a liquid crystal display device.
Figure 5B:
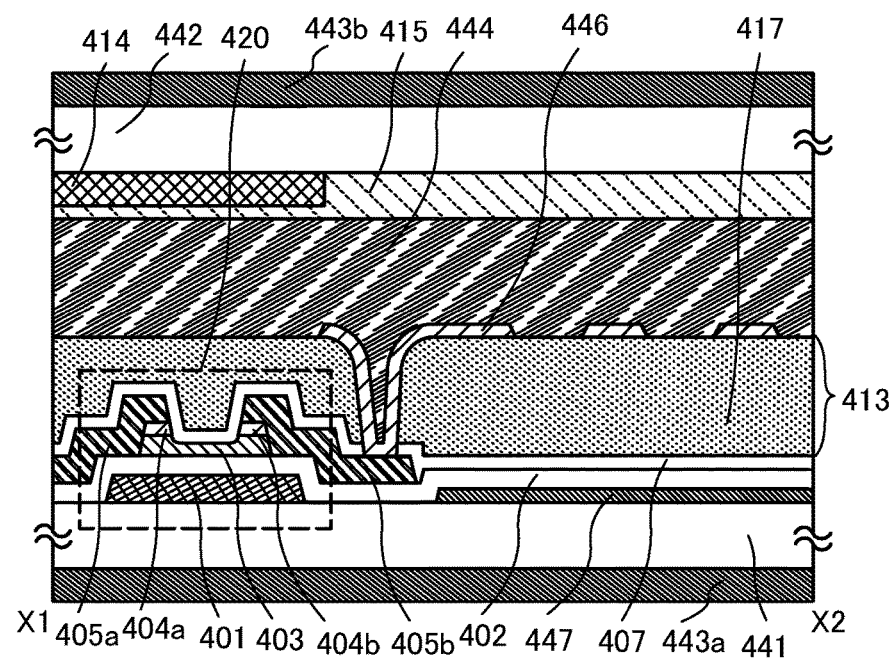

The liquid crystal display device illustrated in FIGS. 5A and 5B shows an example in which a light-blocking layer 414 is further added on the second substrate (counter substrate) 442 side to the liquid crystal display device illustrated in FIGS. 1A and 1B of Embodiment 1. Therefore, components in common with those in Embodiment 1 can be formed using a similar material and a similar manufacturing method, and detailed description of the same portions and portions having similar functions is omitted.

FIG. 5A is a plan view of a liquid crystal display device, and FIG. 5B is a cross-sectional view along line X1 to X2 in FIG. 5A. Note that the plan view of FIG. 5A illustrates only the element substrate side and the counter substrate side is not illustrated.

The light-blocking layer 414 is formed on the liquid crystal layer 444 side of the second substrate 442 and an insulating layer 415 is formed as a planarization film. The light-blocking layer 414 is preferably formed in a region corresponding to the thin film transistor 420 (a region which overlaps with the semiconductor layer of the thin film transistor) with the liquid crystal layer 444 interposed therebetween. The first substrate 441 and the second substrate 442 are firmly attached to each other with the liquid crystal layer 444 interposed therebetween so that the light-blocking layer 414 is positioned to cover at least an upper portion of the semiconductor layer 403 of the thin film transistor 420.

The light-blocking layer 414 has transmittance of visible light lower than the semiconductor layer 403 which is an oxide semiconductor layer.

The light-blocking layer 414 is formed using a light-blocking material that reflects or absorbs light. For example, a black organic resin can be used, which can be formed by mixing a black resin of a pigment material, carbon black, titanium black, or the like into a resin material such as photosensitive or non-photosensitive polyimide. Alternatively, a light-blocking metal film can be used, which may be formed using chromium, molybdenum, nickel, titanium, cobalt, copper, tungsten, aluminum, or the like, for example.

There is no particular limitation on the formation method of the light-blocking layer 414, and a dry method such as vapor deposition, sputtering, CVD, or the like or a wet method such as spin coating, dip coating, spray coating, droplet discharging (e.g., ink jetting, screen printing, or offset printing), or the like may be used depending on the material. If needed, an etching method (dry etching or wet etching) may be employed to form a desired pattern.

The insulating layer 415 may be formed using an organic resin such as acrylic or polyimide by a coating method such as spin coating or various printing methods.

By formation of the light-blocking layer 414 on the counter substrate side in this manner, improvement in contrast and stabilization of the thin film transistor can be achieved. The light-blocking layer 414 can block incident light on the semiconductor layer 403 of the thin film transistor 420; accordingly, electric characteristics of the thin film transistor 420 can be prevented from being varied due to photosensitivity of the oxide semiconductor and can be stabilized. Further, the light-blocking layer 414 can prevent light leakage to an adjacent pixel, which allows higher contrast and higher definition display. Therefore, high definition and high reliability of the liquid crystal display device can be achieved.

Improvement in contrast and viewing angle characteristics enables a liquid crystal display device with higher image quality to be supplied. Further, such a liquid crystal display device can be manufactured at low cost with high productivity.

Further, characteristics of the thin film transistor can be stabilized; thus, reliability of the liquid crystal display device can be improved.

This embodiment can be implemented in combination with any of the structures disclosed in other embodiments as appropriate.

Embodiment 5

A liquid crystal display device including a light-blocking layer (black matrix) is described with reference to FIGS. 6A and 6B.

As the film having a function of attenuating the intensity of transmitting visible light, a coloring layer serving as a light-blocking layer can be used. The liquid crystal display device illustrated in FIGS. 6A and 6B shows an example in which the light-blocking layer 414 is formed in part of the interlayer film 413 on the first substrate 441 (element substrate) side in the liquid crystal display device illustrated in FIGS. 1A and 1B of Embodiment 1. Therefore, components in common with those in Embodiment 1 can be formed using a similar material and a similar manufacturing method, and detailed description of the same portions and portions having similar functions is omitted.

Figure 6A:
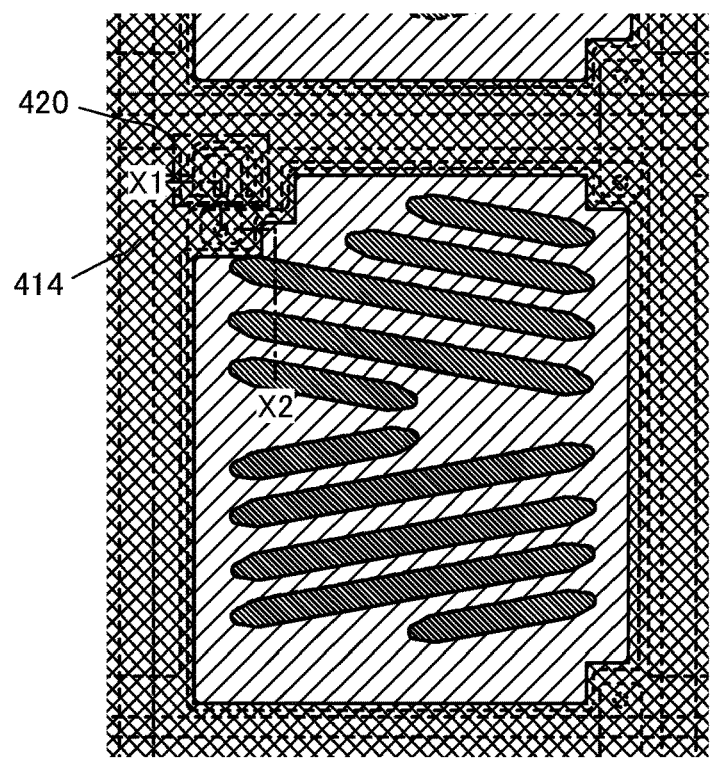
FIGS. 6A and 6B illustrate a liquid crystal display device.
Figure 6B:
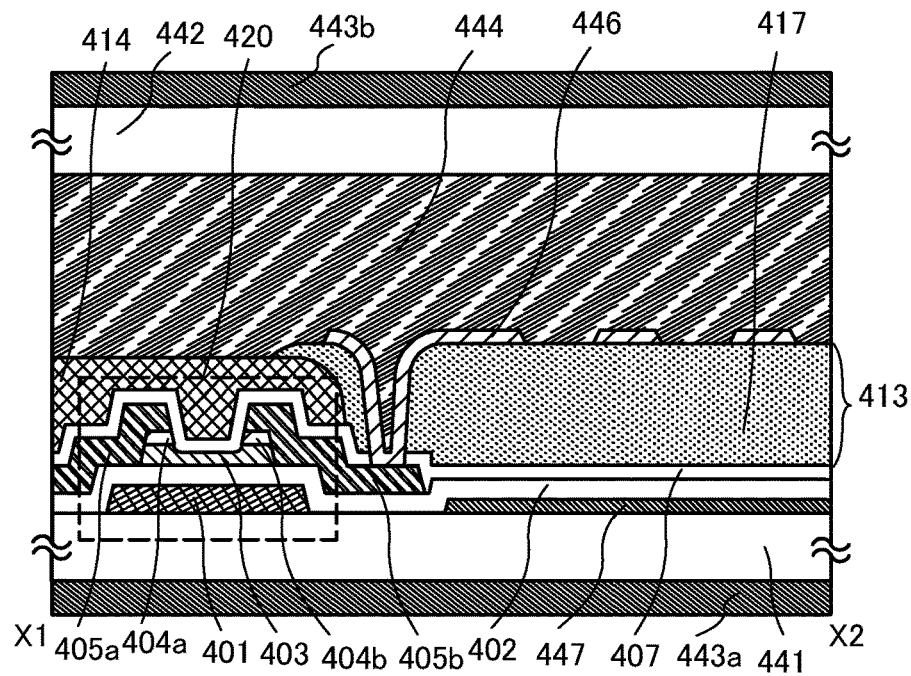

FIG. 6A is a plan view of a liquid crystal display device, and FIG. 6B is a cross-sectional view along line X1 to X2 in FIG. 6A. Note that the plan view of FIG. 6A illustrates only the element substrate side and the counter substrate side is not illustrated.

The interlayer film 413 includes the light-blocking layer 414 and the light-transmitting chromatic-color resin layer 417. The light-blocking layer 414 is provided on the first substrate 441 (element substrate) side and formed over the thin film transistor 420 (at least in a region which covers the semiconductor layer of the thin film transistor) with the insulating film 407 interposed therebetween, so that the light-blocking layer 414 functions as a light-blocking layer which shields the semiconductor layer 403 from light. On the other hand, the light-transmitting chromatic-color resin layer 417 is formed in a region which overlaps with the first electrode layer 447 and in a region which overlaps with the second electrode layer 446 and functions as a color filter layer. In the liquid crystal display device of FIG. 6B, part of the second electrode layer 446 is formed over the light-blocking layer 414 and the liquid crystal layer 444 is provided thereover.

The light-blocking layer 414 has transmittance of visible light lower than the semiconductor layer 403 which is an oxide semiconductor layer.

Since the light-blocking layer 414 is used in the interlayer film, it is preferable that black organic resin be used for the light-blocking layer 414. For example, a black resin of a pigment material, carbon black, titanium black, or the like may be mixed into a resin material such as photosensitive or non-photosensitive polyimide. As the formation method of the light-blocking layer 414, a wet method such as spin coating, dip coating, spray coating, droplet discharging (e.g., ink jetting, screen printing, or offset printing), or the like or a dry method such as vapor deposition, sputtering, CVD, or the like may be used depending on the material. If needed, an etching method (dry etching or wet etching) may be employed to form a desired pattern.

The light-blocking layer may be further formed on the counter substrate side of the liquid crystal display device because further improvement in contrast and stabilization of the thin film transistor can be achieved. When the light-blocking layer is formed on the counter substrate side, the light-blocking layer is formed in a region corresponding to the thin film transistor (at least in a region overlapping with the semiconductor layer of the thin film transistor) with the liquid crystal layer interposed therebetween, so that electric characteristics of the thin film transistor can be prevented from being varied due to light incident from the counter substrate.

In the case of providing the light-blocking layer on the counter substrate side, there is a case where light from the element substrate and light from the counter substrate toward the semiconductor layer of the thin film transistor can be blocked by a light-blocking wiring layer, electrode layer, or the like. Thus, the light-blocking layer need not always be formed to cover the thin film transistor.

Figure 17A:
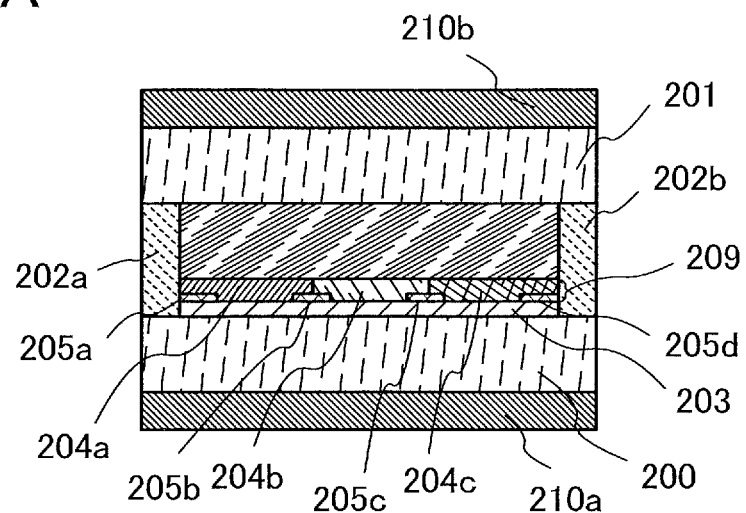
FIGS. 17A and 17B illustrate a liquid crystal display device.
Figure 17B:
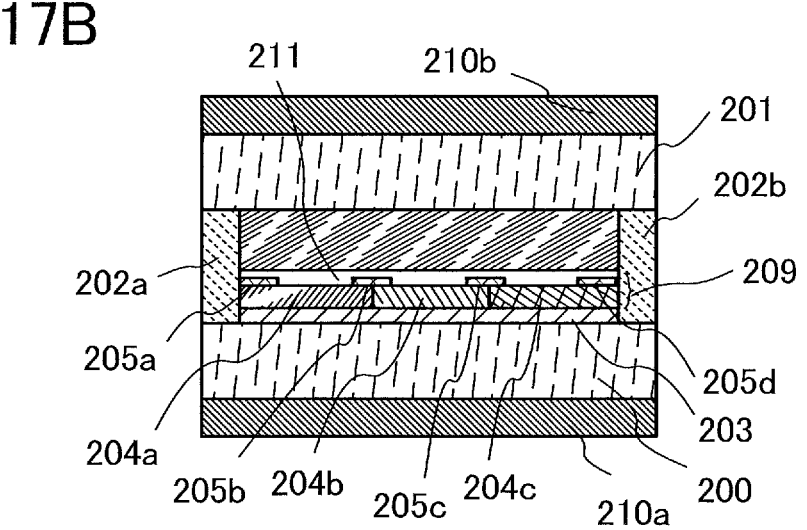

Alternatively, the light-blocking layer may be provided so as to be stacked over or below the light-transmitting chromatic-color resin layer. Examples of the stacked structure of the light-blocking layer and the light-transmitting chromatic-color resin layer are illustrated in FIGS. 17A and 17B. In FIGS. 17A and 17B, an element layer 203 is formed over a first substrate 200 which is an element substrate and an interlayer film 209 is formed over the element layer 203. The interlayer film 209 includes light-transmitting chromatic-color resin layers 204a, 204b, and 204c and light-blocking layers 205a, 205b, 205c, and 205d. The light-blocking layers 205a, 205b, 205c, and 205d are formed at boundaries of the light-transmitting chromatic-color resin layers 204a, 204b, and 204c. Note that the pixel electrode layer and the common electrode layer are omitted in FIGS. 17A and 17B.

A plurality of chromatic colors can be used. For example, the liquid crystal display device in FIGS. 17A and 17B may use a coloring layer of red, a coloring layer of green, and a coloring layer of blue as the light-transmitting chromatic-color resin layer 204a, the light-transmitting chromatic-color resin layer 204b, and the light-transmitting chromatic-color resin layer 204c, respectively; thus, light-transmitting chromatic-color resin layers of plural colors are used.

FIGS. 17A and 17B illustrate examples in which thin films that are thinner than the light-transmitting chromatic-color resin layers are used as the light-blocking layers and the light-blocking layers are stacked below or over the light-transmitting chromatic-color resin layers. As such light-blocking layers, thin films of light-blocking inorganic films (e.g., metal films) are preferable.

In FIG. 17A, thin films of the light-blocking layers 205a, 205b, 205c, and 205d are formed over the element layer 203, and the light-transmitting chromatic-color resin layers 204a, 204b, and 204c are stacked over the light-blocking layers 205a, 205b, 205c, and 205d. In FIG. 17B, the light-transmitting chromatic-color resin layers 204a, 204b, and 204c are formed over the element layer 203; thin films of the light-blocking layers 205a, 205b, 205c, and 205d are stacked over the light-transmitting chromatic-color resin layers 204a, 204b, and 204c; and an insulating film 211 is formed as an overcoat film over the light-blocking layers 205a, 205b, 205c, and 205d. The element layer, the light-blocking layers, and the light-transmitting chromatic-color resin layers may be stacked directly as illustrated in FIG. 17B, or they may have an insulating film over, below, or between the layers.

As sealants 202a and 202b, it is typically preferable to use a visible light curable resin, an ultraviolet curable resin, or a thermosetting resin. Typically, an acrylic resin, an epoxy resin, an amine resin, or the like can be used. Further, a photopolymerization initiator (typically, an ultraviolet light polymerization initiator), a thermosetting agent, a filler, or a coupling agent may be included in the sealants 202a and 202b.

When the light-blocking layer is provided in this manner, the light-blocking layer can block incident light on the semiconductor layer 403 of the thin film transistor without reduction in an aperture ratio of a pixel; accordingly, electric characteristics of the thin film transistor can be prevented from being varied due to photosensitivity of the oxide semiconductor and can be stabilized. Further, the light-blocking layer can prevent light leakage to an adjacent pixel, which enables higher contrast and higher definition display. Therefore, high definition and high reliability of the liquid crystal display device can be achieved.

Further, the light-transmitting chromatic-color resin layer 417 can function as a color filter layer. In the case of providing the color filter layer on the counter substrate side, precise positional alignment of a pixel region with an element substrate over which the thin film transistor is formed is difficult, and accordingly there is a possibility that image quality is degraded. Here, since the light-transmitting chromatic-color resin layer 417 is formed directly on the element substrate side, the formation region can be controlled more precisely and this structure is adjustable to a pixel with a fine pattern. In addition, one insulating layer can serve as both the interlayer film and the color filter layer, whereby the process can be simplified and a liquid crystal display device can be manufactured at low cost.

Improvement in contrast and viewing angle characteristics enables a liquid crystal display device with higher image quality to be supplied. Further, such a liquid crystal display device can be manufactured at low cost with high productivity.

Further, characteristics of the thin film transistor can be stabilized; thus, reliability of the liquid crystal display device can be improved.

This embodiment can be implemented in combination with any of the structures disclosed in other embodiments as appropriate.

Embodiment 6

Another example of a thin film transistor which can be applied to the liquid crystal display devices in Embodiments 1 to 5 is described. Note that components in common with those in Embodiments 1 to 5 can be formed using a similar material and a similar manufacturing method, and detailed description of the same portions and portions having similar functions is omitted.

Figure 10A:
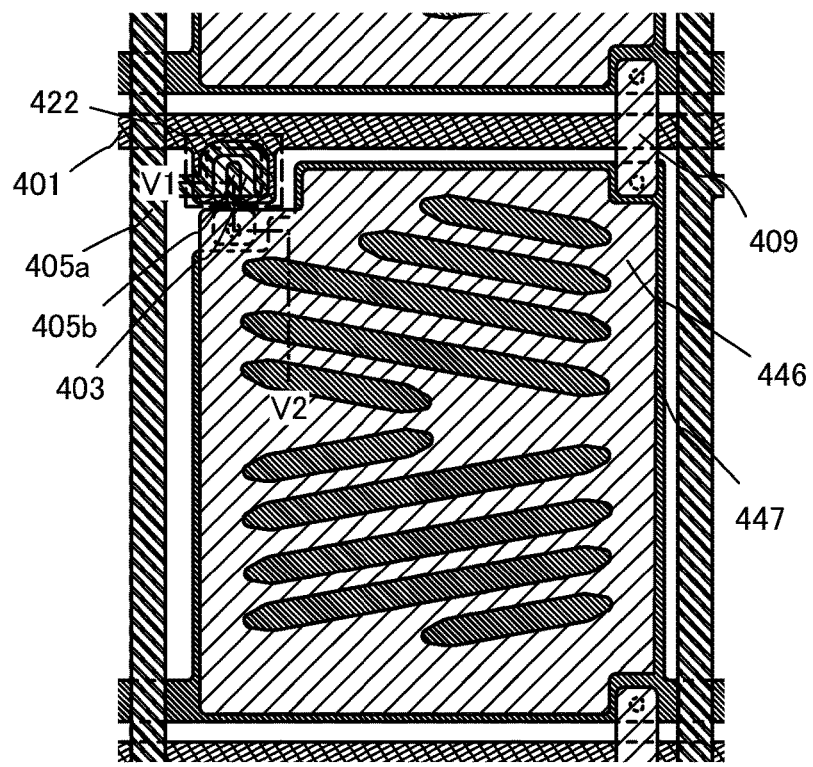
FIG. 10A and 10B illustrate a liquid crystal display device.
Figure 10B:
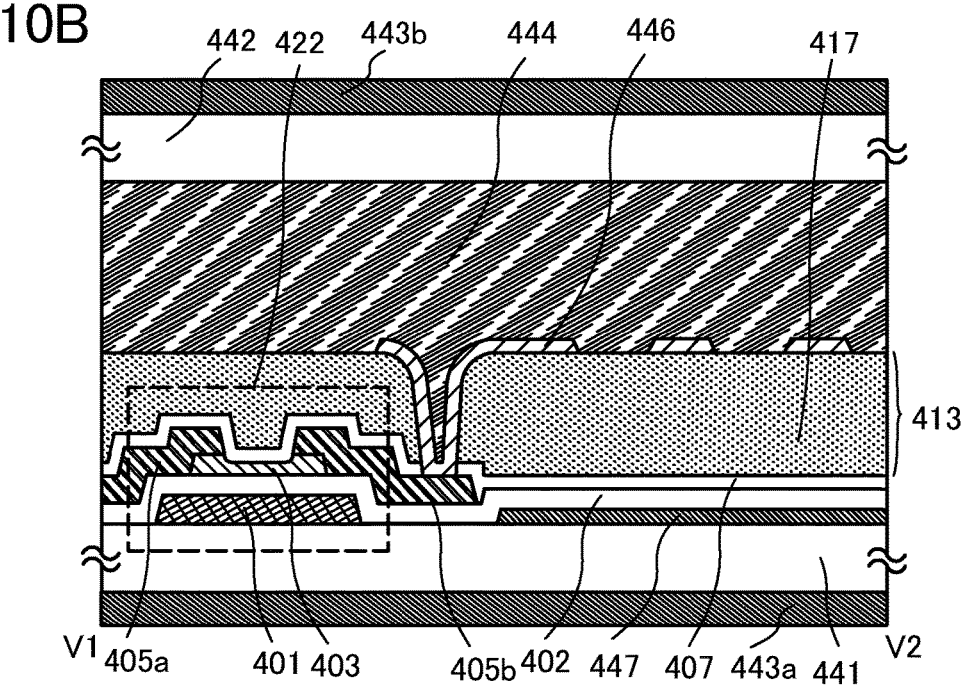

An example of a liquid crystal display device including a thin film transistor which has a structure in which source and drain electrode layers are in contact with a semiconductor layer without an n$^+$ layer interposed therebetween is illustrated in FIGS. 10A and 10B.

FIG. 10A is a plan view of a liquid crystal display device and illustrates one pixel. FIG. 10B is a cross-sectional view along line V1 to V2 in FIG. 10A.

In the plane view of FIG. 10A, in a manner similar to Embodiment 1, a plurality of source wiring layers (including the wiring layer 405a) are provided in parallel to each other (extended in a vertical direction in the drawing) and apart from each other. A plurality of gate wiring layers (including the gate electrode layer 401) are provided apart from each other and extended in a direction generally perpendicular to the source wiring layers (a horizontal direction in the drawing). Common wiring layers (common electrode layers) are provided adjacent to the respective plurality of gate wiring layers and extended in a direction generally parallel to the gate wiring layers, that is, in a direction generally perpendicular to the source wiring layers (a horizontal direction in the drawing). A roughly rectangular space is surrounded by the source wiring layers, the common wiring layers (common electrode layers), and the gate wiring layers. In this space, a pixel electrode layer and a common electrode layer of the liquid crystal display device are provided. A thin film transistor 422 for driving the pixel electrode layer is provided at the upper left corner in the drawing. A plurality of pixel electrode layers and thin film transistors are provided in matrix.

In the liquid crystal display device of FIGS. 10A and 10B, the second electrode layer 446 electrically connected to the thin film transistor 422 functions as a pixel electrode layer, and the first electrode layer 447 electrically connected to the common wiring layer functions as a common electrode layer. Note that as shown in FIGS. 10A and 10B, the first electrode layer 447 also serves as the common wiring layer in the pixel; thus, adjacent pixels are electrically connected to each other with the common electrode layer 409. Note than a capacitor is formed with the pixel electrode layer and the common electrode layer.

The first substrate 441 provided with the thin film transistor 422, the interlayer film 413 which is a light-transmitting chromatic-color resin layer, the first electrode layer 447, and the second electrode layer 446 and the second substrate 442 are firmly attached to each other with the liquid crystal layer 444 interposed therebetween.

The thin film transistor 422 has a structure in which the semiconductor layer 403 is in contact with the wiring layers 405a and 405b serving as source and drain electrode layers without an n$^+$ layer interposed therebetween.

When a coloring layer which is the light-transmitting chromatic-color resin layer 417 is used as the interlayer film 413 provided over the thin film transistor 422, the intensity of incident light on the semiconductor layer 403 of the thin film transistor 422 can be attenuated without reduction in an aperture ratio of a pixel. Accordingly, electric characteristics of the thin film transistor 422 can be prevented from being varied due to photosensitivity of the oxide semiconductor and can be stabilized. Further, the light-transmitting chromatic-color resin layer 417 can function as a color filter layer. In the case of providing the color filter layer on the counter substrate side, precise positional alignment of a pixel region with an element substrate over which the thin film transistor is formed is difficult, and accordingly there is a possibility that image quality is degraded. Here, since the interlayer film is formed as the color filter layer directly on the element substrate side, the formation region can be controlled more precisely and this structure is adjustable to a pixel with a fine pattern. In addition, one insulating layer can serve as both the interlayer film and the color filter layer, whereby the process can be simplified and a liquid crystal display device can be manufactured at low cost.

Improvement in contrast and viewing angle characteristics and higher response speed enable a liquid crystal display device with higher image quality and higher performance to be supplied. Further, such a liquid crystal display device can be manufactured at low cost with high productivity.

Further, characteristics of the thin film transistor can be stabilized; thus, reliability of the liquid crystal display device can be improved.

This embodiment can be implemented in combination with any of the structures disclosed in other embodiments as appropriate.

Embodiment 7

Another example of a thin film transistor which can be applied to the liquid crystal display devices in Embodiments 1 to 5 are described with reference to FIGS. 9A and 9B.

Figure 9A:
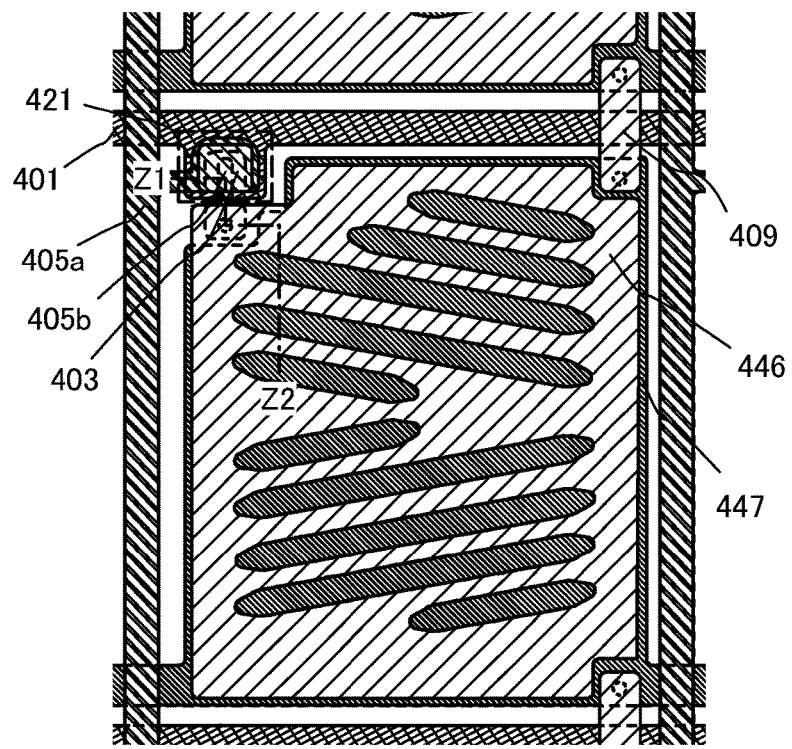
FIGS. 9A and 9B illustrate a liquid crystal display device.

FIG. 9A is a plan view of a liquid crystal display device and illustrates one pixel. FIG. 9B is a cross-sectional view along line Z1 to Z2 in FIG. 9A.

In the plane view of FIG. 9A, in a manner similar to Embodiment 1, a plurality of source wiring layers (including the wiring layer 405a) are provided in parallel to each other (extended in a vertical direction in the drawing) and apart from each other. A plurality of gate wiring layers (including the gate electrode layer 401) are provided apart from each other and extended in a direction generally perpendicular to the source wiring layers (a horizontal direction in the drawing). Common wiring layers (common electrode layers) are provided adjacent to the respective plurality of gate wiring layers and extended in a direction generally parallel to the gate wiring layers, that is, in a direction generally perpendicular to the source wiring layers (a horizontal direction in the drawing). A roughly rectangular space is surrounded by the source wiring layers, the common wiring layers (common electrode layers), and the gate wiring layers. In this space, a pixel electrode layer and a common electrode layer of the liquid crystal display device are provided. A thin film transistor 421 for driving the pixel electrode layer is provided at the upper left corner in the drawing. A plurality of pixel electrode layers and thin film transistors are provided in matrix.

Figure 9B:
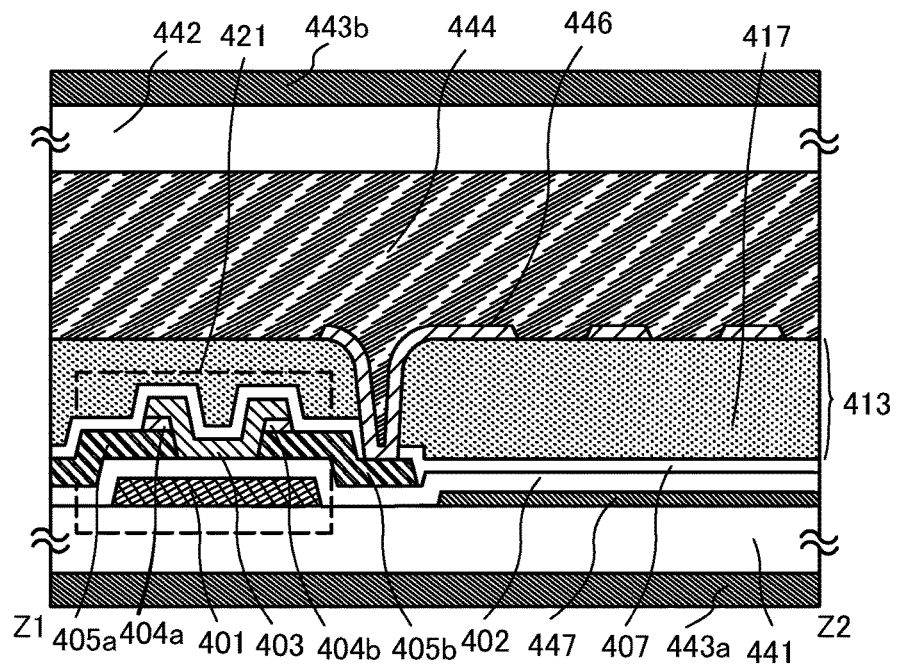

In the liquid crystal display device of FIGS. 9A and 9B, the second electrode layer 446 electrically connected to the thin film transistor 421 functions as a pixel electrode layer, and the first electrode layer 447 electrically connected to the common wiring layer functions as a common electrode layer. Note that, as shown in FIGS. 9A and 9B, the first electrode layer 447 also serves as the common wiring layer in the pixel; thus, adjacent pixels are electrically connected to each other with the common electrode layer 409. Note that a capacitor is formed with the pixel electrode layer and the common electrode layer.

The first substrate 441 provided with the thin film transistor 421, the interlayer film 413 which is a light-transmitting chromatic-color resin layer, the first electrode layer 447, and a second electrode layer 446 and the second substrate 442 are firmly attached to each other with the liquid crystal layer 444 interposed therebetween.

The thin film transistor 421 is a bottom-gate thin film transistor and includes, over the first substrate 441 having an insulating surface, the gate electrode layer 401, the gate insulating layer 402, the wiring layers 405a and 405b serving as source and drain electrode layers, the n$^+$ layers 404a and 404b serving as source and drain regions, and the semiconductor layer 403. In addition, the insulating film 407 which covers the thin film transistor 421 and is in contact with the semiconductor layer 403 is provided. An In—Ga—Zn—O-based non-single-crystal film is used for the semiconductor layer 403 and the n$^+$ layers 404a and 404b. The thin film transistor 421 having such a structure shows characteristics of a mobility of 20 cm$^2$/Vs or more and a subthreshold swing (S value) of 0.4 V/dec or less. Thus, the thin film transistor can operate at high speed, and a driver circuit (a source driver or a gate driver) such as a shift register can be formed over the same substrate as the pixel portion is.

It is preferable that reverse sputtering in which an argon gas is introduced to generate plasma be performed on the gate insulating layer 402 and the wiring layers 405a and 405b before formation of the semiconductor layer 403 by sputtering, in order to remove dust attached to surfaces.

The semiconductor layer 403 and the n$^+$ layers 404a and 404b are preferably subjected to heat treatment at 200° C. to 600° C., typically 300° C. to 500° C. For example, heat treatment is performed for 1 hour at 350° C. in a nitrogen atmosphere. There is no particular limitation on when to perform this heat treatment, as long as it is performed after oxide semiconductor films used for the semiconductor layer 403 and the n$^+$ layers 404a and 404b are formed.

In addition, oxygen radical treatment may be performed on the semiconductor layer 403.

The gate insulating layer 402 exists in the entire region including the thin film transistor 421, and the thin film transistor 421 is provided with the gate electrode layer 401 between the gate insulating layer 402 and the first substrate 441 which is a substrate having an insulating surface. The wiring layers 405a and 405b and the n$^+$ layers 404a and 404b are provided over the gate insulating layer 402. In addition, the semiconductor layer 403 is provided over the gate insulating layer 402, the wiring layers 405a and 405b, and the n$^+$ layers 404a and 404b. Although not illustrated, a wiring layer is provided over the gate insulating layer 402 in addition to the wiring layers 405a and 405b and the wiring layer extends beyond the perimeter of the semiconductor layer 403 to the outside.

When a coloring layer which is the light-transmitting chromatic-color resin layer 417 is used as the interlayer film 413 provided over the thin film transistor 421, the intensity of incident light on the semiconductor layer 403 of the thin film transistor 421 can be attenuated without reduction in an aperture ratio of a pixel. Accordingly, electric characteristics of the thin film transistor 421 can be prevented from being varied due to photosensitivity of the oxide semiconductor and can be stabilized. Further, the light-transmitting chromatic-color resin layer 417 can function as a color filter layer. In the case of providing the color filter layer on the counter substrate side, precise positional alignment of a pixel region with an element substrate over which the thin film transistor is formed is difficult, and accordingly there is a possibility that image quality is degraded. Here, since the interlayer film is formed as the color filter layer directly on the element substrate side, the formation region can be controlled more precisely and this structure is adjustable to a pixel with a fine pattern. In addition, one insulating layer can serve as both the interlayer film and the color filter layer, whereby the process can be simplified and a liquid crystal display device can be manufactured at low cost.

Improvement in contrast and viewing angle characteristics enables a liquid crystal display device with higher image quality to be supplied. Further, such a liquid crystal display device can be manufactured at low cost with high productivity.

Further, characteristics of the thin film transistor can be stabilized; thus, reliability of the liquid crystal display device can be improved.

This embodiment can be implemented in combination with any of the structures disclosed in other embodiments as appropriate.

Embodiment 8

Another example of a thin film transistor which can be applied to the liquid crystal display devices in Embodiments 1 to 5 is described. Note that components in common with those in Embodiments 1 to 5 can be formed using a similar material and a similar manufacturing method, and detailed description of the same portions and portions having similar functions is omitted.

Figure 11A:
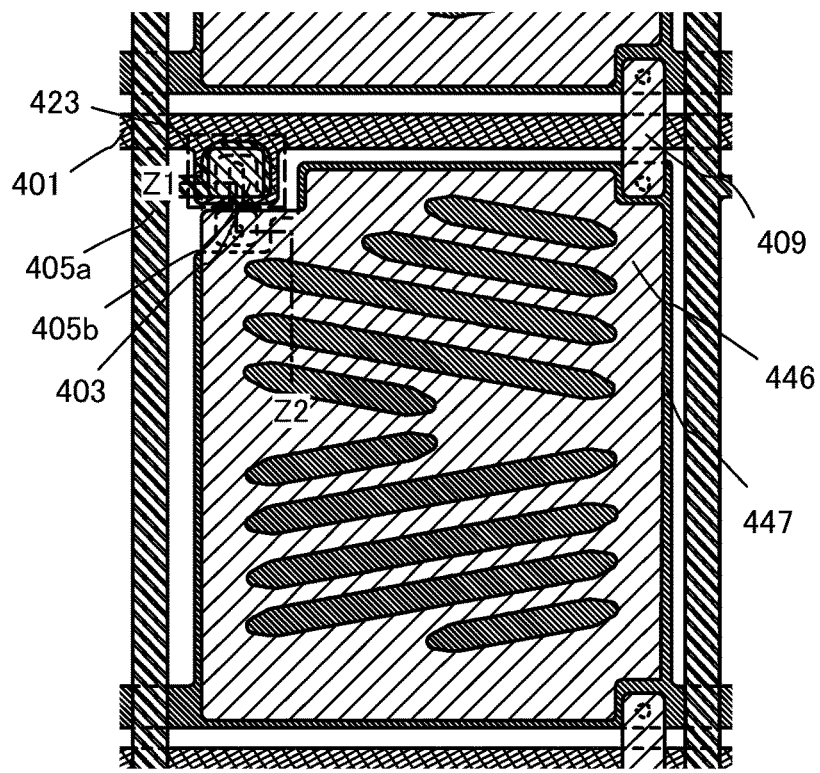
FIGS. 11A and 11B illustrate a liquid crystal display device.
Figure 11B:
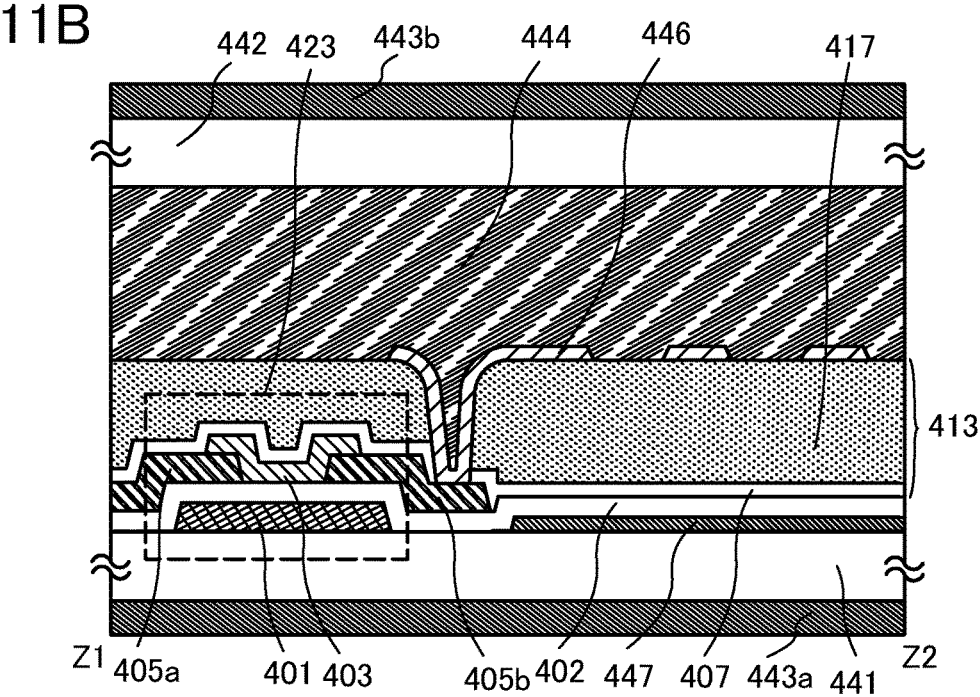

An example of a liquid crystal display device including a thin film transistor which has a structure in which source and drain electrode layers are in contact with a semiconductor layer without an n+ layer interposed therebetween is illustrated in FIGS. 11A and 11B.

FIG. 11A is a plan view of a liquid crystal display device and illustrates one pixel. FIG. 11B is a cross-sectional view along line Y1 to Y2 in FIG. 11A.

In the plan view of FIG. 11A, in a manner similar to Embodiment 1, a plurality of source wiring layers (including the wiring layer 405a) are provided in parallel to each other (extended in a vertical direction in the drawing) and apart from each other. A plurality of gate wiring layers (including the gate electrode layer 401) are provided apart from each other and extended in a direction generally perpendicular to the source wiring layers (a horizontal direction in the drawing). Common wiring layers (common electrode layers) are provided adjacent to the respective plurality of gate wiring layers and extended in a direction generally parallel to the gate wiring layers, that is, in a direction generally perpendicular to the source wiring layers (a horizontal direction in the drawing). A roughly rectangular space is surrounded by the source wiring layers, the common electrode layers (common electrode layers), and the gate wiring layers. In this space, a pixel electrode layer and a common electrode layer of the liquid crystal display device are provided. A thin film transistor 423 for driving the pixel electrode layer is provided at the upper left corner in the drawing. A plurality of pixel electrode layers and thin film transistors are provided in matrix.

In the liquid crystal display device of FIGS. 11A and 11B, the second electrode layer 446 electrically connected to the thin film transistor 432 functions as a pixel electrode layer, and the first electrode layer 447 electrically connected to the common wiring layer functions as a common electrode layer. Note that as shown in FIGS. 11A and 11B, the first electrode layer 447 also serves as the common wiring layer in the pixel; thus adjacent pixels are electrically connected to each other with the common electrode layer 409. Note that a capacitor is formed with the pixel electrode layer and the common electrode layer.

The first substrate 441 provided with the thin film transistor 423, the interlayer film 413 which is a light-transmitting chromatic-color resin layer, the first electrode layer 447, and the second electrode layer 446 and the second substrate 442 are firmly attached to each other with the liquid crystal layer 444 interposed therebetween.

The gate insulating layer 402 exists in the entire region including the thin film transistor 423, and the thin film transistor 423 is provided with the gate electrode layer 401 between the gate insulating layer 402 and the first substrate 441 which is a substrate having an insulating surface. The wiring layers 405a and 405b are provided over the gate insulating layer 402. In addition, the semiconductor layer 403 is provided over the gate insulating layer 402 and the wiring layers 405a and 405b. Although not illustrated, a wiring layer is provided over the gate insulating layer 402 in addition to the wiring layers 405a and 405b, and the wiring layer extends beyond the perimeter of the semiconductor layer 403 to the outside.

When a coloring layer which is the light-transmitting chromatic-color resin layer 417 is used as the interlayer film 413 provided over the thin film transistor 423, the intensity of incident light on the semiconductor layer 403 of the thin film transistor 423 can be attenuated without reduction in an aperture ratio of a pixel. Accordingly, electric characteristics of the thin film transistor 423 can be prevented from being varied due to photosensitivity of the oxide semiconductor and can be stabilized. Further, the light-transmitting chromatic-color resin layer 417 can function as a color filter layer. In the case of providing the color filter layer on the counter substrate side, precise positional alignment of a pixel region with an element substrate over which the thin film transistor is formed is difficult, and accordingly there is a possibility that image quality is degraded. Here, since the interlayer film is formed as the color filter layer directly on the element substrate side, the formation region can be controlled more precisely and this structure is adjustable to a pixel with a fine pattern. In addition, one insulating layer can serve as both the interlayer film and the color filter layer, whereby the process can be simplified and a liquid crystal display device can be manufactured at low cost.

Improvement in contrast and viewing angle characteristics enables a liquid crystal display device with higher image quality to be supplied. Further, such a liquid crystal display device can be manufactured at low cost with high productivity.

Further, characteristics of the thin film transistor can be stabilized; thus, reliability of the liquid crystal display device can be improved.

This embodiment can be implemented in combination with any of the structures disclosed in other embodiments as appropriate.

Embodiment 9

A liquid crystal material which exhibits a blue phase can be used for the liquid crystal layer in the above-described Embodiments. A liquid crystal display device which uses a liquid crystal layer exhibiting a blue phase is described with reference to FIGS. 2A to 2D.

FIGS. 2A to 2D are cross-sectional views of a liquid crystal display device and its manufacturing process.

Figure 2A:
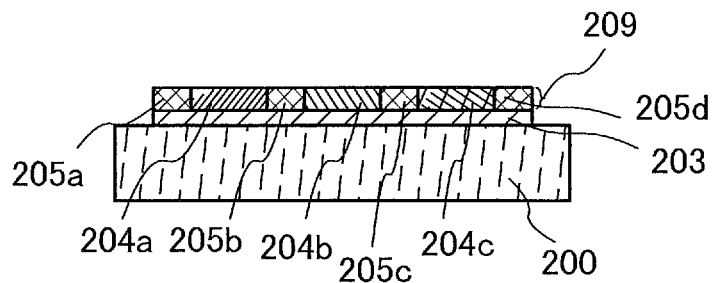
FIGS. 2A to 2D illustrate a method for manufacturing a liquid crystal display device.

In FIG. 2A, the element layer 203 is formed over the first substrate 200 which is an element substrate, and the interlayer film 209 is formed over the element layer 203.

The interlayer film 209 includes the light-transmitting chromatic-color resin layers 204a, 204b, and 204c and the light-blocking layers 205a, 205b, 205c, and 205d which are alternately arranged such that the light-blocking layers sandwich the light-transmitting chromatic-color resin layers. Note that the pixel electrode layer and the common electrode layer are omitted in FIGS. 2A to 2D. For example, the pixel electrode layer and the common electrode layer can have any of the structures described in Embodiments 1 to 8, and a lateral electric field mode can be employed.

Figure 2B:
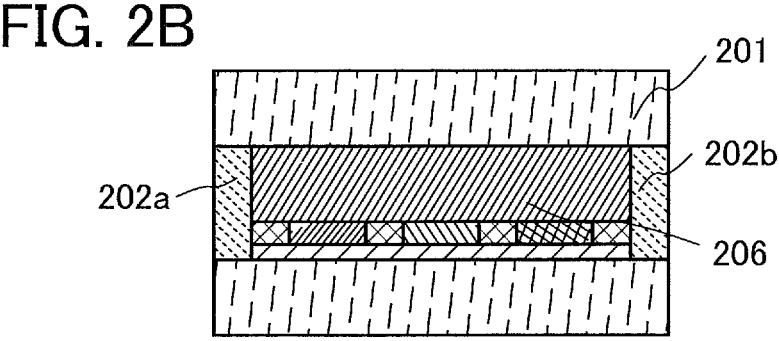

As illustrated in FIG. 2B, the first substrate 200 and the second substrate 201 which is a counter substrate are firmly fixed with the sealants 202a and 202b with a liquid crystal layer 206 interposed therebetween. As a method for forming the liquid crystal layer 206, a dispenser method (dripping method) or an injection method in which after attachment of the first substrate 200 and the second substrate 201, liquid crystal is injected with the use of capillary phenomenon can be used.

A liquid crystal material exhibiting a blue phase can be used for the liquid crystal layer 206. The liquid crystal material exhibiting a blue phase has a short response time of 1 msec or less and enables high-speed response, whereby the liquid crystal display device can show high performance.

The liquid crystal material exhibiting a blue phase includes a liquid crystal and a chiral agent. The chiral agent is employed to align the liquid crystal in a helical structure and to make the liquid crystal exhibit a blue phase. For example, a liquid crystal material into which a chiral agent is mixed at 5 wt % or more may be used for the liquid crystal layer.

As the liquid crystal, a thermotropic liquid crystal, a low-molecular liquid crystal, a high-molecular liquid crystal, a ferroelectric liquid crystal, an anti-ferroelectric liquid crystal, or the like is used.

As the chiral agent, a material having a high compatibility with a liquid crystal and a strong twisting power is used. Either one of two enantiomers, R and S, is used, and a racemic mixture in which R and S are mixed at 50:50 is not used.

The above liquid crystal material exhibits a cholesteric phase, a cholesteric blue phase, a smectic phase, a smectic blue phase, a cubic phase, a chiral nematic phase, an isotropic phase, or the like depending on conditions.

A cholesteric blue phase and a smectic blue phase, which are blue phases, are seen in a liquid crystal material having a cholesteric phase or a smectic phase with a relatively short helical pitch of less than or equal to 500 nm. The alignment of the liquid crystal material has a double twist structure. Having the order of less than or equal to an optical wavelength, the liquid crystal material is transparent, and optical modulation action is generated through a change in alignment order by voltage application. A blue phase is optically isotropic and thus has no viewing angle dependence. Thus, an alignment film is not necessarily formed; therefore, display image quality can be improved and cost can be reduced. In addition, rubbing treatment on an alignment film is unnecessary; accordingly, electrostatic discharge damage caused by the rubbing treatment can be prevented and defects and damage of the liquid crystal display device in the manufacturing process can be reduced. Thus, productivity of the liquid crystal display device can be increased. A thin film transistor that uses an oxide semiconductor layer particularly has a possibility that electric characteristics of the thin film transistor may fluctuate significantly by the influence of static electricity and deviate from the designed range. Therefore, it is more effective to use a blue phase liquid crystal material for a liquid crystal display device including a thin film transistor that uses an oxide semiconductor layer.

The blue phase appears only within a narrow temperature range; therefore, it is preferable that a photocurable resin and a photopolymerization initiator be added to a liquid crystal material and polymer stabilization treatment be performed in order to widen the temperature range. The polymer stabilization treatment is performed in such a manner that a liquid crystal material including a liquid crystal, a chiral agent, a photocurable resin, and a photopolymerization initiator is irradiated with light having a wavelength with which the photocurable resin and the photopolymerization initiator are reacted. This polymer stabilization treatment may be performed by irradiating a liquid crystal material exhibiting an isotropic phase with light or by irradiating a liquid crystal material exhibiting a blue phase under the control of the temperature with light. For example, the polymer stabilization treatment is performed in the following manner: the temperature of a liquid crystal layer is controlled and under the state in which the blue phase is exhibited, the liquid crystal layer is irradiated with light. However, the polymer stabilization treatment is not limited to this manner and may be performed in such a manner that a liquid crystal layer under the state of exhibiting an isotropic phase at a temperature within +10° C., preferably +5° C. of the phase transition temperature between the blue phase and the isotropic phase is irradiated with light. The phase transition temperature between the blue phase and the isotropic phase is a temperature at which the phase changes from the blue phase to the isotropic phase when the temperature rises, or a temperature at which the phase changes from the isotropic phase to the blue phase when the temperature decreases. As an example of the polymer stabilization treatment, the following method can be employed: after heating a liquid crystal layer to exhibit the isotropic phase, the temperature of the liquid crystal layer is gradually decreased so that the phase changes to the blue phase, and then, irradiation with light is performed while the temperature at which the blue phase is exhibited is kept. Alternatively, after the phase changes to the isotropic phase by gradually heating a liquid crystal layer, the liquid crystal layer can be irradiated with light under a temperature within +10° C., preferably +5° C. of the phase transition temperature between the blue phase and the isotropic phase (under the state of exhibiting an isotropic phase). In the case of using an ultraviolet curable resin (a UV curable resin) as the photocurable resin included in the liquid crystal material, the liquid crystal layer may be irradiated with ultraviolet rays. Even in the case where the blue phase is not exhibited, if polymer stabilization treatment is performed by irradiation with light under a temperature within +10° C., preferably +5° C. of the phase transition temperature between the blue phase and the isotropic phase (under the state of exhibiting an isotropic phase), the response time can be made as short as 1 msec or less and high-speed response is possible.

The photocurable resin may be a monofunctional monomer such as acrylate or methacrylate; a polyfunctional monomer such as diacrylate, triacrylate, dimethacrylate, or trimethacrylate; or a mixture thereof. Further, the photocurable resin may have liquid crystallinity, non-liquid crystallinity, or both of them. A resin which is cured with light having a wavelength with which the photopolymerization initiator to be used is reacted may be selected as the photocurable resin, and an ultraviolet curable resin can be typically used.

As the photopolymerization initiator, a radical polymerization initiator which generates radicals by light irradiation, an acid generator which generates an acid by light irradiation, or a base generator which generates a base by light irradiation may be used.

Specifically, a mixture of JC-1041XX (produced by Chisso Corporation) and 4-cyano-4'-pentylbiphenyl can be used as the liquid crystal material. ZLI-4572 (produced by Merck Ltd., Japan) can be used as the chiral agent. As the photocurable resin, 2-ethylhexyl acrylate, RM257 (produced by Merck Ltd., Japan), or trimethylolpropane triacrylate can be used. As the photopolymerization initiator, 2,2-dimethoxy-2-phenylacetophenone can be used.

The liquid crystal layer 206 is formed using a liquid crystal material including a liquid crystal, a chiral agent, a photocurable resin, and a photopolymerization initiator.

Figure 2C:
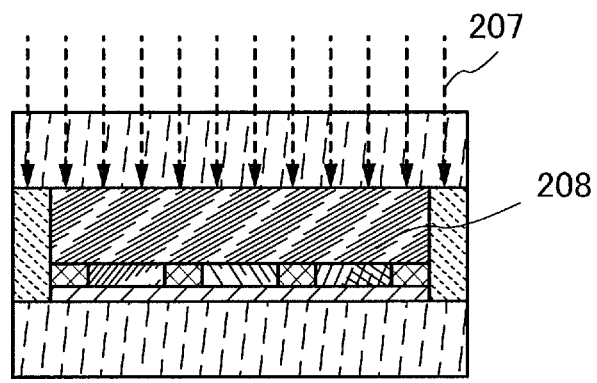

As illustrated in FIG. 2C, polymer stabilization treatment is performed on the liquid crystal layer 206 by irradiation with light 207, so that a liquid crystal layer 208 is formed. The light 207 is light having a wavelength with which the photocurable resin and the photopolymerization initiator included in the liquid crystal layer 206 are reacted. By this polymer stabilization treatment using light irradiation, the temperature range in which the liquid crystal layer 208 exhibits a blue phase can be widened.

In the case where a photocurable resin such as an ultraviolet curable resin is used as a sealant and a liquid crystal layer is formed by a dropping method, for example, the sealant may be cured by the light irradiation step of the polymer stabilization treatment.

When a liquid crystal display device has a structure in which a color filter layer and a light-blocking layer are formed over an element substrate as illustrated in FIGS. 2A to 2D, irradiation light from the counter substrate side is not absorbed or blocked by the color filter layer and the light-blocking layer; accordingly, the entire region of the liquid crystal layer can be uniformly irradiated with the light. Thus, alignment disorder of a liquid crystal due to nonuniform photopolymerization, display unevenness due to the alignment disorder, and the like can be prevented. In addition, since a thin film transistor is shielded from light by the light-blocking layer, electric characteristics of the thin film transistor are kept stable.

Figure 2D:
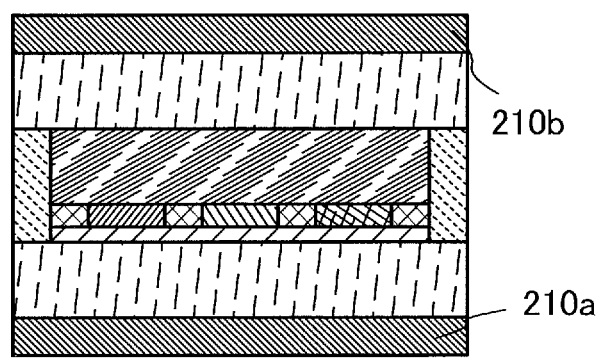

As illustrated in FIG. 2D, a polarizing plate 210a is provided on the outer side (a side opposite from a side provided with the liquid crystal layer 208) of the first substrate 200 and a polarizing plate 210b is provided on the outer side (a side opposite from a side provided with the liquid crystal layer 208) of the second substrate 201. In addition to the polarizing plates, an optical film such as a retardation plate or an anti-reflection film may be provided. For example, circular polarization may be employed using a polarizing plate or a retardation plate. Through the above-described process, a liquid crystal display device can be completed.

In the case of manufacturing a plurality of liquid crystal display devices using a large-sized substrate (a so-called multiple panel method), a division step can be performed before the polymer stabilization treatment or before provision of the polarizing plates. In consideration of the influence of the division step on the liquid crystal layer (such as alignment disorder due to force applied in the division step), it is preferable that the division step be performed after the attachment between the first substrate and the second substrate and before the polymer stabilization treatment.

Although not illustrated, a backlight, a sidelight, or the like may be used as a light source. Light from the light source is emitted from the side of the first substrate 200, which is an element substrate, so as to pass through the second substrate 201 on the viewer side.

Improvement in contrast and viewing angle characteristics enables a liquid crystal display device with higher image quality and higher performance to be supplied. Further, such a liquid crystal display device can be manufactured at low cost with high productivity.

Further, characteristics of the thin film transistor can be stabilized; thus, reliability of the liquid crystal display device can be improved.

This embodiment can be implemented in combination with any of the structures disclosed in other embodiments as appropriate.

Embodiment 10

A thin film transistor is manufactured, and a liquid crystal display device having a display function can be manufactured using the thin film transistor in a pixel portion and further in a driver circuit. Further, part or whole of a driver circuit can be formed over the same substrate as a pixel portion is, using a thin film transistor, whereby a system-on-panel can be obtained.

The liquid crystal display device includes a liquid crystal element (also referred to as a liquid crystal display element) as a display element.

Further, a liquid crystal display device includes a panel in which a liquid crystal display element is sealed, and a module in which an IC or the like including a controller is mounted to the panel. An embodiment of the present invention also relates to an element substrate, which corresponds to one mode before the display element is completed in a manufacturing process of the liquid crystal display device, and the element substrate is provided with means for supplying current to the display element in each of a plurality of pixels. Specifically, the element substrate may be in a state after only a pixel electrode of the display element is formed, a state after a conductive film to be a pixel electrode is formed and before the conductive film is etched to form the pixel electrode, or any of other states.

Note that a liquid crystal display device in this specification means an image display device, a display device, or a light source (including a lighting device). Furthermore, the liquid crystal display device also includes the following modules in its category: a module to which a connector such as a flexible printed circuit (FPC), a tape automated bonding (TAB) tape, or a tape carrier package (TCP) is attached; a module having a TAB tape or a TCP at the tip of which a printed wiring board is provided; and a module in which an integrated circuit (IC) is directly mounted on a display element by chip on glass (COG).

Figure 12A:
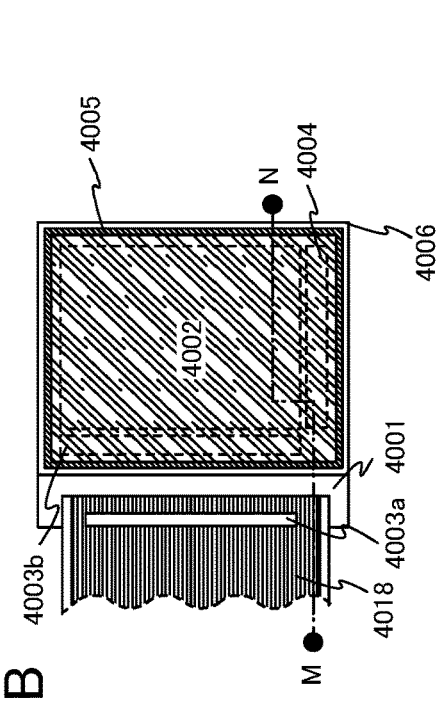
FIGS. 12A to 12C illustrate a liquid crystal display device.
Figure 12B:
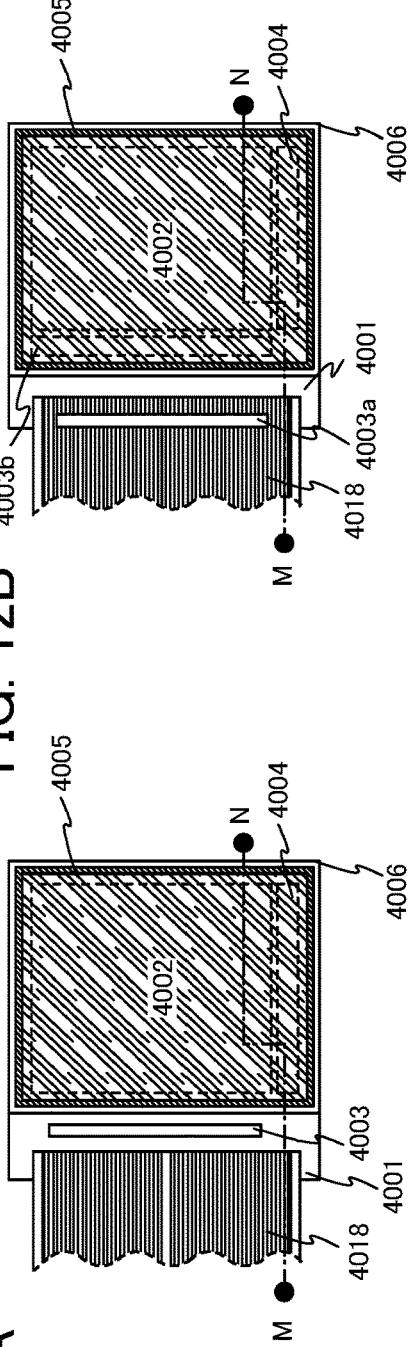
Figure 12C:
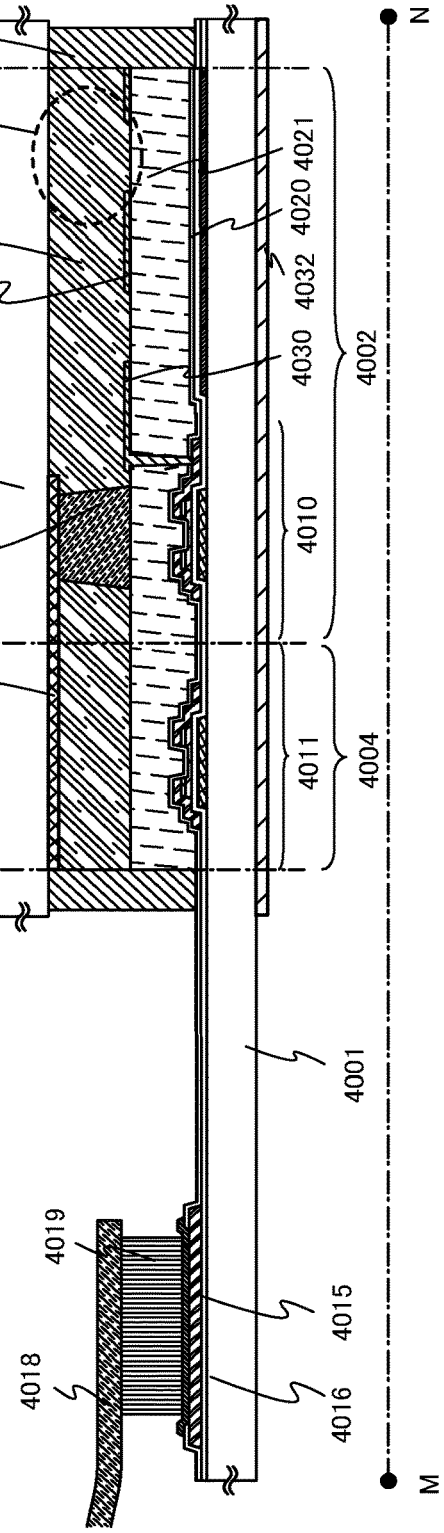

The appearance and a cross section of a liquid crystal display panel, which is one embodiment of a liquid crystal display device, is described with reference to FIGS. 12A to 12C. FIGS. 12A and 12B are top views of a panel in which highly reliable thin film transistors 4010 and 4011 each including an oxide semiconductor film as a semiconductor layer and a liquid crystal element 4013 are sealed between a first substrate 4001 and a second substrate 4006 with a sealant 4005. FIG. 12C is a cross-sectional view along line M to N of FIGS. 12A and 12B.

The sealant 4005 is provided so as to surround a pixel portion 4002 and a scanning line driver circuit 4004 that are provided over the first substrate 4001. The second substrate 4006 is provided over the pixel portion 4002 and the scanning line driver circuit 4004. Therefore, the pixel portion 4002 and the scanning line driver circuit 4004 are sealed together with a liquid crystal layer 4008, by the first substrate 4001, the sealant 4005, and the second substrate 4006.

In FIG. 12A, a signal line driver circuit 4003 that is formed using a single crystal semiconductor film or a polycrystalline semiconductor film over a substrate separately prepared is mounted in a region that is different from the region surrounded by the sealant 4005 over the first substrate 4001. In contrast, FIG. 12B illustrates an example in which part of a signal line driver circuit is formed over the first substrate 4001 with use of a thin film transistor including an oxide semiconductor. A signal line driver circuit 4003b is formed over the first substrate 4001 and a signal line driver circuit 4003a which is formed using a single crystal semiconductor film or a polycrystalline semiconductor film is mounted on the substrate separately prepared.

Note that there is no particular limitation on the connection method of a driver circuit which is separately formed, and a COG method, a wire bonding method, a TAB method, or the like can be used. FIG. 12A illustrates an example of mounting the signal line driver circuit 4003 by a COG method, and FIG. 12B illustrates an example of mounting the signal line driver circuit 4003 by a TAB method.

The pixel portion 4002 and the scanning line driver circuit 4004 provided over the first substrate 4001 include a plurality of thin film transistors. FIG. 12C illustrates the thin film transistor 4010 included in the pixel portion 4002 and the thin film transistor 4011 included in the scanning line driver circuit 4004. An insulating layer 4020 and an interlayer film 4021 are provided over the thin film transistors 4010 and 4011.

Any of the highly reliable thin film transistors including an oxide semiconductor film as a semiconductor layer, which are described in Embodiments 1 to 8, can be used as the thin film transistors 4010 and 4011. The thin film transistors 4010 and 4011 are n-channel thin film transistors.

A pixel electrode layer 4030 and a common electrode layer 4031 are provided over the first substrate 4001, and the pixel electrode layer 4030 is electrically connected to the thin film transistor 4010. The liquid crystal element 4013 includes the pixel electrode layer 4030, the common electrode layer 4031, and the liquid crystal layer 4008. Note that a polarizing plate 4032 and a polarizing plate 4033 are provided on the outer sides of the first substrate 4001 and the second substrate 4006, respectively.

As the first substrate 4001 and the second substrate 4006, glass, plastic, or the like having a light-transmitting property can be used. As plastic, a fiberglass-reinforced plastics (FRP) plate, a polyvinyl fluoride (PVF) film, a polyester film, or an acrylic resin film can be used. Further, sheet in which aluminum foil is sandwiched by PVF films or polyester films can also be used.

A columnar spacer denoted by reference numeral 4035 is obtained by selective etching of an insulating film and is provided in order to control the thickness (a cell gap) of the liquid crystal layer 4008. Note that a spherical spacer may be used. In the liquid crystal display device using the liquid crystal layer 4008, the thickness (the cell gap) of the liquid crystal layer 4008 is preferably about 5 μm to 20 μm.

Although FIGS. 12A to 12C illustrate examples of transmissive liquid crystal display devices, an embodiment of the present invention can also be applied to a transflective liquid crystal display device.

FIGS. 12A to 12C illustrate examples of liquid crystal display devices in which a polarizing plate is provided on the outer side (the view side) of a substrate; however, the polarizing plate may be provided on the inner side of the substrate. The position of the polarizing plate may be determined as appropriate depending on the material of the polarizing plate and conditions of the manufacturing process. Furthermore, a light-blocking layer serving as a black matrix may be provided.

The interlayer film 4021 is a light-transmitting chromatic-color resin layer and functions as a color filter layer. A light-blocking layer may be included in part of the interlayer film 4021. In FIGS. 12A to 12C, a light-blocking layer 4034 is provided on the second substrate 4006 side so as to cover the thin film transistors 4010 and 4011. By the light-blocking layer 4034, improvement in contrast and stabilization of the thin film transistors can be achieved.

When a coloring layer which is the light-transmitting chromatic-color resin layer is used as the interlayer film 4021 provided over the thin film transistor, the intensity of incident light on the semiconductor layer of the thin film transistor can be attenuated without reduction in an aperture ratio of a pixel. Accordingly, electric characteristics of the thin film transistor can be prevented from being varied due to photosensitivity of the oxide semiconductor and can be stabilized. Further, the light-transmitting chromatic-color resin layer can function as a color filter layer. In the case of providing the color filter layer on the counter substrate side, precise positional alignment of a pixel region with an element substrate over which the thin film transistor is formed is difficult, and accordingly there is a possibility that image quality is degraded. Here, since the interlayer film is formed as the color filter layer directly on the element substrate side, the formation region can be controlled more precisely and this structure is adjustable to a pixel with a fine pattern. In addition, one insulating layer can serve as both the interlayer film and the color filter layer, whereby the process can be simplified and a liquid crystal display device can be manufactured at low cost.

The thin film transistors may be covered with the insulating layer 4020 which serves as a protective film of the thin film transistors; however, there is no particular limitation to such a structure.

Note that the protective film is provided to prevent entry of impurities floating in air, such as an organic substance, a metal substance, or moisture, and is preferably a dense film. The protective film may be formed by a sputtering method to be a single-layer film or a stack of a silicon oxide film, a silicon nitride film, a silicon oxynitride film, a silicon nitride oxide film, an aluminum oxide film, an aluminum nitride film, an aluminum oxynitride film, and/or an aluminum nitride oxide film.

After the protective film is formed, the semiconductor layer may be subjected to annealing (300° C. to 400° C.).

Further, in the case of further forming a light-transmitting insulating layer as a planarizing insulating film, the light-transmitting insulating layer can be formed using an organic material having heat resistance, such as polyimide, acrylic, benzocyclobutene, polyamide, or epoxy. Other than such organic materials, it is also possible to use a low-dielectric constant material (a low-k material), a siloxane-based resin, PSG (phosphosilicate glass), BPSG (borophosphosilicate glass), or the like. The insulating layer may be formed by stacking a plurality of insulating films formed of these materials.

There is no particular limitation on the formation method of the insulating layer having a stacked structure, and the following method can be employed in accordance with the material: sputtering, an SOG method, spin coating, dip coating, spray coating, droplet discharging (e.g., ink jetting, screen printing, or offset printing), doctor knife, roll coating, curtain coating, knife coating, or the like. In the case where the insulating layer is formed using a material solution, the semiconductor layer may be annealed (at 200° C. to 400° C.) at the same time of a baking step. The baking step of the insulating layer also serves as the annealing step of the semiconductor layer, whereby a liquid crystal display device can be manufactured efficiently.

The pixel electrode layer 4030 and the common electrode layer 4031 can be formed using a light-transmitting conductive material such as indium oxide containing tungsten oxide, indium zinc oxide containing tungsten oxide, indium oxide containing titanium oxide, indium tin oxide containing titanium oxide, indium tin oxide (hereinafter referred to as ITO), indium zinc oxide, or indium tin oxide to which silicon oxide is added.

A conductive composition containing a conductive high molecule (also referred to as a conductive polymer) can be used for the pixel electrode layer 4030 and the common electrode layer 4031.

In addition, a variety of signals and potentials are supplied to the signal line driver circuit 4003 which is formed separately, and the scanning line driver circuit 4004 or the pixel portion 4002 from an FPC 4018.

Further, since the thin film transistor is easily broken by static electricity and the like, a protection circuit for protecting the driver circuits is preferably provided over the same substrate for a gate line or a source line. The protection circuit is preferably formed using a nonlinear element in which an oxide semiconductor is used.

In FIGS. 12A to 12C, a connecting terminal electrode 4015 is formed using the same conductive film as that of the pixel electrode layer 4030, and a terminal electrode 4016 is formed using the same conductive film as that of source and drain electrode layers of the thin film transistors 4010 and 4011.

The connecting terminal electrode 4015 is electrically connected to a terminal included in the FPC 4018 through an anisotropic conductive film 4019.

Although FIGS. 12A to 12C illustrate an example in which the signal line driver circuit 4003 is formed separately and mounted on the first substrate 4001, the present invention is not limited to this structure. The scanning line driver circuit may be formed separately and then mounted, or only a part of the signal line driver circuit or a part of the scanning line driver circuit may be formed separately and then mounted.

Figure 16:
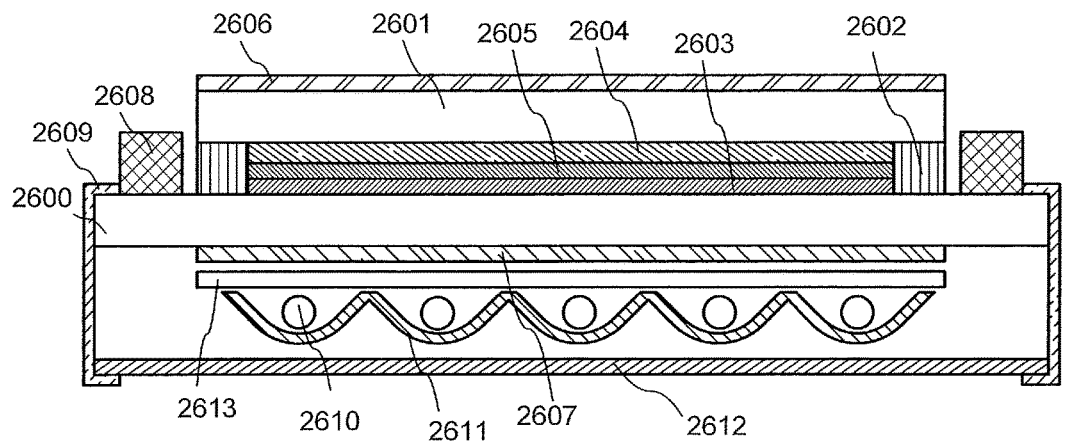
FIG. 16 illustrates a liquid crystal display module.

FIG. 16 illustrates an example of a liquid crystal display module which is formed as a liquid crystal display device disclosed in this specification.

FIG. 16 illustrates an example of the liquid crystal display module, in which an element substrate 2600 and a counter substrate 2601 are attached to each other with a sealant 2602, and an element layer 2603 including a TFT or the like, a display element 2604 including a liquid crystal layer, and an interlayer film 2605 including a light-transmitting chromatic-color resin layer that functions as a color filter are provided between the substrates to form a display region. The interlayer film 2605 including a light-transmitting chromatic-color resin layer is necessary to perform color display. In the case of the RGB system, respective light-transmitting chromatic-color resin layers corresponding to colors of red, green, and blue are provided for respective pixels. The polarizing plate 2606 is provided on the outer side of the counter substrate 2601 and a polarizing plate 2607 and a diffuser plate 2613 are provided on the outer side of the element substrate 2600. A light source includes a cold cathode tube 2610 and a reflective plate 2611, and a circuit substrate 2612 is connected to a wiring circuit portion 2608 of the element substrate 2600 through a flexible wiring board 2609 and includes an external circuit such as a control circuit and a power source circuit. As the light source, a white diode may be used. The polarizing plate and the liquid crystal layer may be stacked with a retardation plate interposed therebetween.

Through the above process, a highly reliable liquid crystal display panel as a liquid crystal display device can be manufactured.

This embodiment can be implemented in combination with any of the structures disclosed in other embodiments as appropriate.

Embodiment 11

A liquid crystal display device disclosed in this specification can be applied to a variety of electronic appliances (including game machines). As the electronic appliances, for example, there are a television device (also called a television or a television receiver), a monitor for a computer or the like, a camera such as a digital camera or a digital video camera, a digital photo frame, a mobile phone (also called a mobile phone or a mobile telephone device), a portable game console, a portable information terminal, an audio playback device, and a large game machine such as a pachinko machine.

Figure 13A:
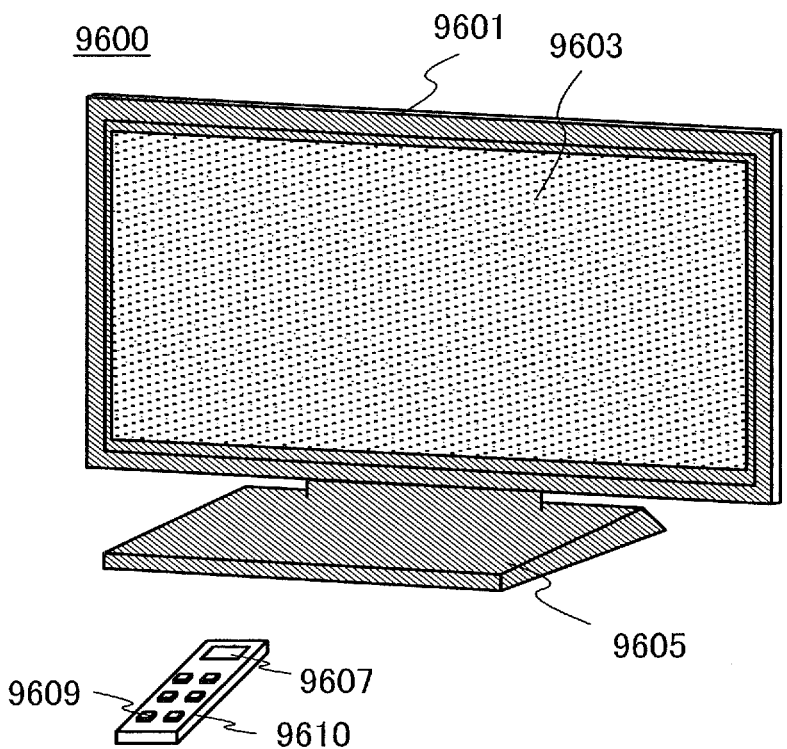
FIG. 13A is an external view illustrating an example of a television device and FIG. 13B is an external view illustrating an example of a digital photo frame.

FIG. 13A illustrates an example of a television device 9600. A display portion 9603 is incorporated in a housing 9601 of the television device 9600. The display portion 9603 can display images. Here, the housing 9601 is supported on a stand 9605.

The television device 9600 can be operated by an operation switch of the housing 9601 or a separate remote controller 9610. The channel and volume can be controlled with operation keys 9609 of the remote controller 9610 and the images displayed on the display portion 9603 can be controlled. Moreover, the remote controller 9610 may have a display portion 9607 on which the information outgoing from the remote controller 9610 is displayed.

Note that the television device 9600 is provided with a receiver, a modem, and the like. With the receiver, general television broadcasting can be received. Moreover, when the display device is connected to a communication network with or without wires via the modem, one-way (from a sender to a receiver) or two-way (e.g., between a sender and a receiver or between receivers) information communication can be performed.

Figure 13B:
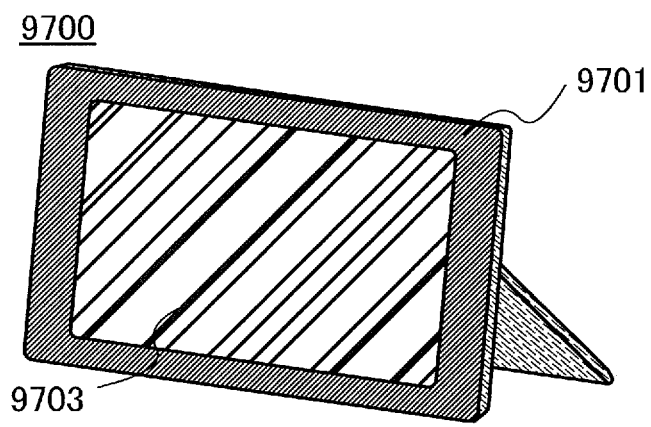

FIG. 13B illustrates an example of a digital photo frame 9700. For example, a display portion 9703 is incorporated in a housing 9701 of the digital photo frame 9700. The display portion 9703 can display a variety of images, for example, displays image data taken with a digital camera or the like, so that the digital photo frame can function in a manner similar to a general picture frame.

Note that the digital photo frame 9700 is provided with an operation portion, an external connection terminal (such as a USB terminal or a terminal which can be connected to a variety of cables including a USB cable), a storage medium inserting portion, and the like. They may be incorporated on the same plane as the display portion; however, they are preferably provided on a side surface or the rear surface of the display portion because the design is improved. For example, a memory including image data taken with a digital camera is inserted into the storage medium inserting portion of the digital photo frame and the image data is imported. Then, the imported image data can be displayed on the display portion 9703.

The digital photo frame 9700 may send and receive information wirelessly. Via wireless communication, desired image data can be wirelessly imported into the digital photo frame 9700 and displayed.

Figure 14A:
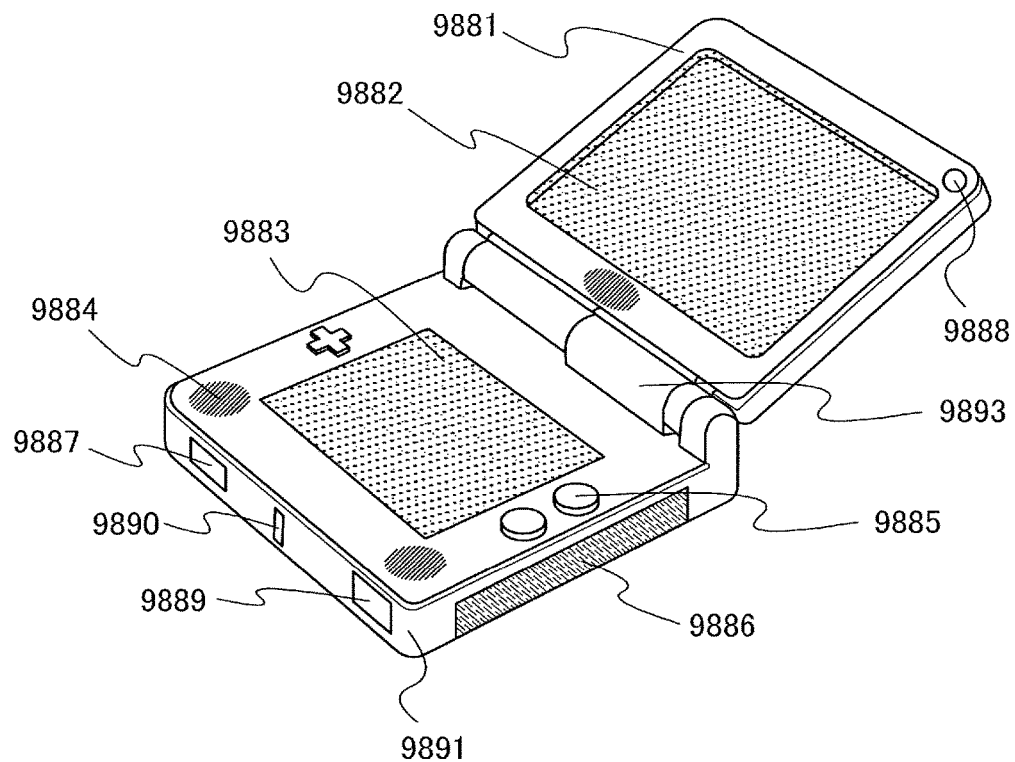
FIGS. 14A and 14B are external views illustrating examples of game machines.

FIG. 14A illustrates a portable game console including a housing 9881 and a housing 9891 which are jointed with a connector 9893 so as to be opened and closed. A display portion 9882 and a display portion 9883 are incorporated in the housing 9881 and the housing 9891, respectively. The portable game console illustrated in FIG. 14A additionally includes a speaker portion 9884, a storage medium inserting portion 9886, an LED lamp 9890, an input means (operation keys 9885, a connection terminal 9887, a sensor 9888 (having a function of measuring force, displacement, position, speed, acceleration, angular speed, rotational frequency, distance, light, liquid, magnetism, temperature, chemical substance, sound, time, hardness, electric field, current, voltage, electric power, radiation, flow rate, humidity, gradient, vibration, smell, or infrared ray), and a microphone 9889), and the like. Needless to say, the structure of the portable game console is not limited to the above, and may be any structure which is provided with at least a liquid crystal display device disclosed in this specification. Moreover, another accessory may be provided as appropriate. The portable game console illustrated in FIG. 14A has a function of reading a program or data stored in a storage medium to display it on the display portion, and a function of sharing information with another portable game console via wireless communication. The portable game console of FIG. 14A can have a variety of functions other than those above.

Figure 14B:
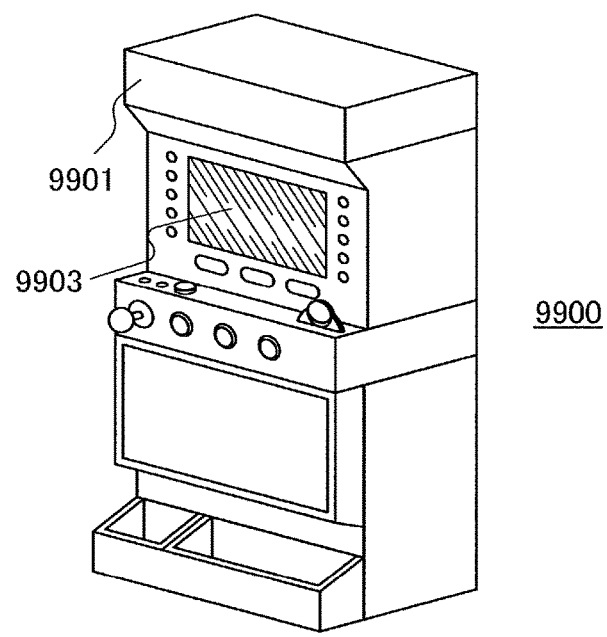

FIG. 14B illustrates an example of a slot machine 9900, which is a large game machine. A display portion 9903 is incorporated in a housing 9901 of the slot machine 9900. The slot machine 9900 additionally includes an operation means such as a start lever or a stop switch, a coin slot, a speaker, and the like. Needless to say, the structure of the slot machine 9900 is not limited to the above and may be any structure which is provided with at least a liquid crystal display device disclosed in this specification. Moreover, another accessory may be provided as appropriate.

Figure 15A:
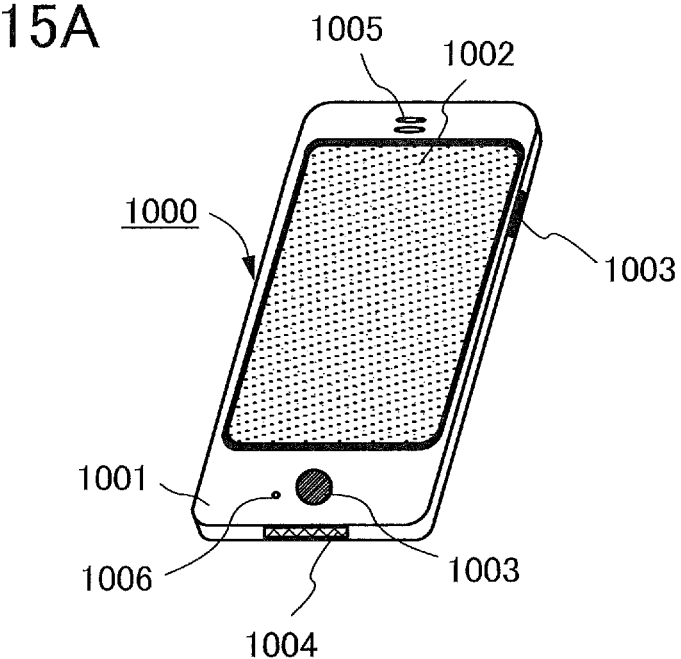
FIGS. 15A and 15B are external views illustrating examples of mobile phones.

FIG. 15A illustrates an example of a mobile phone 1000. The mobile phone 1000 includes a housing 1001 in which a display portion 1002 is incorporated, and moreover includes an operation button 1003, an external connection port 1004, a speaker 1005, a microphone 1006, and the like.

Information can be input to the mobile phone 1000 illustrated in FIG. 15A by touching the display portion 1002 with a finger or the like. Moreover, calling or text messaging can be performed by touching the display portion 1002 with a finger or the like.

There are mainly three screen modes of the display portion 1002. The first mode is a display mode mainly for displaying images. The second mode is an input mode mainly for inputting information such as text. The third mode is a display-and-input mode in which two modes of the display mode and the input mode are mixed.

For example, in the case of calling or text messaging, the display portion 1002 is set to a text input mode mainly for inputting text, and text input operation can be performed on a screen. In this case, it is preferable to display a keyboard or number buttons on almost the entire screen of the display portion 1002.

When a detection device including a sensor for detecting inclination, such as a gyroscope or an acceleration sensor, is provided inside the mobile phone 1000, display on the screen of the display portion 1002 can be automatically switched by judging the direction of the mobile phone 1000 (whether the mobile phone 1000 is placed horizontally or vertically for a landscape mode or a portrait mode).

Further, the screen modes are switched by touching the display portion 1002 or operating the operation button 1003 of the housing 1001. Alternatively, the screen modes can be switched depending on kinds of images displayed on the display portion 1002. For example, when a signal for an image displayed on the display portion is data of moving images, the screen mode is switched to the display mode. When the signal is text data, the screen mode is switched to the input mode.

Further, in the input mode, a signal is detected by an optical sensor in the display portion 1002 and if input by touching the display portion 1002 is not performed for a certain period, the screen mode may be controlled so as to be switched from the input mode to the display mode.

The display portion 1002 can also function as an image sensor. For example, an image of a palm print, a fingerprint, or the like is taken by touching the display portion 1002 with the palm or the finger, whereby personal authentication can be performed. Moreover, when a backlight or sensing light source which emits near-infrared light is provided in the display portion, an image of finger veins, palm veins, or the like can be taken.

Figure 15B:
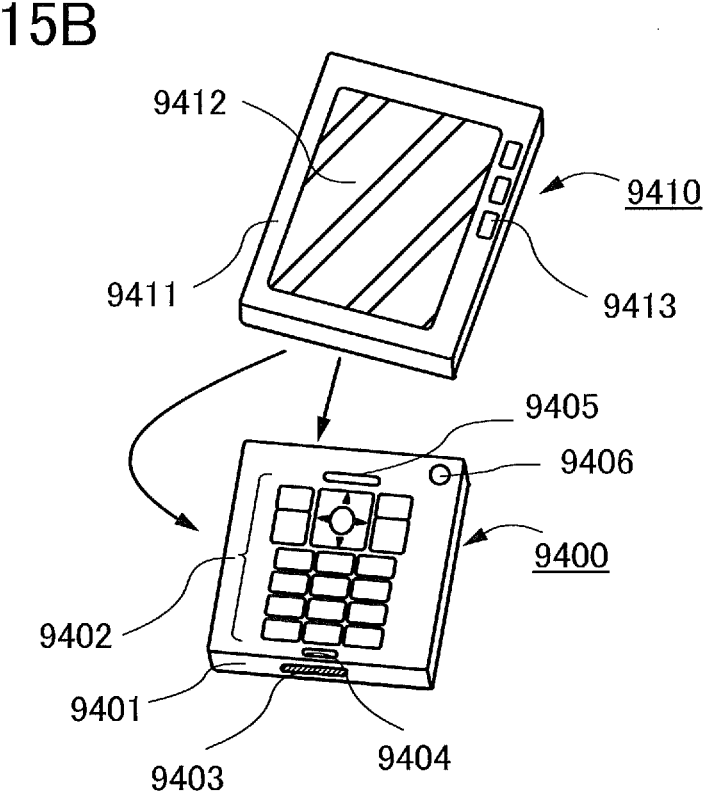

FIG. 15B also illustrates an example of a mobile phone. The mobile phone illustrated in FIG. 15B includes a display device 9410 having a display portion 9412 and operation buttons 9413 in a housing 9411 and a communication device 9400 having scan buttons 9402, an external input terminal 9403, a microphone 9404, a speaker 9405, and a light-emitting portion 9406 which emits light when receiving a call in a housing 9401. The display device 9410 having a display function can be detached from or attached to the communication device 9400 having a telephone function in two directions indicated by the arrows. Accordingly, the display device 9410 and the communication device 9400 can be attached to each other along their short sides or long sides. In addition, when only the display function is needed, the display device 9410 can be detached from the communication device 9400 and used alone. Images or input information can be transmitted or received by wireless or wire communication between the communication device 9400 and the display device 9410, each of which has a rechargeable battery.

This application is based on Japanese Patent Application serial no. 2008-308787 filed with Japan Patent Office on Dec. 3, 2008, the entire contents of which are hereby incorporated by reference.

What is claimed is:

1. A liquid crystal display device comprising:
    a transistor over a substrate, the transistor comprising:
        a gate electrode comprising a copper layer;
        a first oxide semiconductor layer over the gate electrode, the first oxide semiconductor layer comprising indium, gallium, and zinc;
        a second oxide semiconductor layer over the first oxide semiconductor layer; and
        a source electrode layer and a drain electrode layer electrically connected to the first oxide semiconductor layer;
    a first insulating film over the transistor, the first insulating film comprising a first opening;
    a resin layer over the transistor, the resin layer comprising a second opening;
    a first electrode layer over the resin layer, the first electrode layer being directly in contact with one of the source electrode layer and the drain electrode layer through the first opening and the second opening, and the first electrode layer not comprising a slit;
    a second insulating film over the first electrode layer;
    a second electrode layer over the second insulating film, the second electrode layer comprising a slit; and
    a liquid crystal layer,
    wherein the first oxide semiconductor layer comprises a depressed portion between the source electrode layer and the drain electrode layer,
    wherein one of the first electrode layer and the second electrode layer is a pixel electrode layer which is electrically connected to the transistor, and the other of the first electrode layer and the second electrode layer is a common electrode layer, and
    wherein the liquid crystal display device is configured to display an image by a lateral electric field mode.

2. The liquid crystal display device according to claim 1, wherein the gate electrode further comprises a titanium layer overlapping with the copper layer.

3. The liquid crystal display device according to claim 1, wherein the first electrode layer is positioned between the substrate and the second electrode layer.

4. The liquid crystal display device according to claim 1, wherein the first electrode layer and the second electrode layer comprise a same material.

5. The liquid crystal display device according to claim 1, wherein the lateral electric field mode is an FFS mode.

6. The liquid crystal display device according to claim 1,
   wherein the resin layer is a light-transmitting chromatic-color resin layer, and
   wherein the light-transmitting chromatic-color resin layer is overlapped with the pixel electrode layer and the first oxide semiconductor layer.

7. The liquid crystal display device according to claim 1, wherein the transistor further comprises a gate insulating film between the gate electrode and the first oxide semiconductor layer.

* * * * *